United States Patent
Nomura et al.

(10) Patent No.: US 11,511,827 B2
(45) Date of Patent: Nov. 29, 2022

(54) VEHICLE AND METHOD FOR MONITORING ABNORMALITY OF POWER TRANSMISSION MECHANISM

(71) Applicant: HONDA MOTOR CO., LTD., Tokyo (JP)

(72) Inventors: Naoki Nomura, Saitama (JP); Makoto Hattori, Saitama (JP); Hirotaka Onuki, Saitama (JP); Masayuki Sunamoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/599,170

(22) PCT Filed: Sep. 11, 2020

(86) PCT No.: PCT/JP2020/034576
§ 371 (c)(1),
(2) Date: Sep. 28, 2021

(87) PCT Pub. No.: WO2021/049646
PCT Pub. Date: Mar. 18, 2021

(65) Prior Publication Data
US 2022/0089251 A1   Mar. 24, 2022

(30) Foreign Application Priority Data

Sep. 11, 2019 (JP) .............................. JP2019-165698

(51) Int. Cl.
*B62B 9/04* (2006.01)
*B62M 6/50* (2010.01)
(Continued)

(52) U.S. Cl.
CPC .............. *B62M 6/50* (2013.01); *B62M 11/04* (2013.01); *B62M 25/08* (2013.01); *B62M 2025/003* (2013.01)

(58) Field of Classification Search
CPC ........ B62M 6/50; B62M 11/04; B62M 25/08; B62M 2025/003
(Continued)

(56) References Cited

U.S. PATENT DOCUMENTS 6,591,929 B1 * 7/2003 Tsuboi ..................... B62M 6/70
                                                              180/206.7
9,327,801 B2 * 5/2016 Arimune .................. B62M 6/50
(Continued)

FOREIGN PATENT DOCUMENTS

EP   3061683 A2   8/2016
EP   3534044 A1   9/2019
(Continued)

OTHER PUBLICATIONS

Nov. 24, 2020, International Search Report issued for related PCT application No. PCT/JP2020/034576.
(Continued)

*Primary Examiner* — Zhen Y Wu
(74) *Attorney, Agent, or Firm* — Paratus Law Group, PLLC

(57) ABSTRACT

An electric bicycle includes: a sleeve to which power for driving the electric bicycle is input; a rear wheel; and a power transmission mechanism that transmits the power input to the sleeve to the rear wheel. The electric bicycle determines an abnormality of the power transmission mechanism or prevents or prohibits driving performed by using the power transmission mechanism based on a reference composite gear ratio of the power transmission mechanism acquired at a first time and current composite gear ratio
(Continued)

of the power transmission mechanism acquired at a second time subsequent to the first time.

15 Claims, 14 Drawing Sheets

(51) Int. Cl.
  *B62M 11/04*   (2006.01)
  *B62M 25/08*   (2006.01)
  *B62M 25/00*   (2006.01)
(58) Field of Classification Search
  USPC .......................................................... 280/26
  See application file for complete search history.

(56) References Cited

U.S. PATENT DOCUMENTS

| | | | |
|---|---|---|---|
| 9,546,731 B2* | 1/2017 | Watarai | ................... B62M 11/16 |
| 2004/0112161 A1* | 6/2004 | Takamoto | .............. B62M 25/08 |
| | | | 74/473.13 |
| 2014/0032067 A1* | 1/2014 | Miglioranza | ............. F16H 9/04 |
| | | | 701/60 |
| 2014/0166383 A1 | 6/2014 | Arimune | |
| 2014/0213397 A1* | 7/2014 | Yamaguchi | ............ B62K 23/04 |
| | | | 474/80 |
| 2015/0345620 A1* | 12/2015 | Watarai | ................... B62M 11/16 |
| | | | 701/52 |
| 2016/0101827 A1* | 4/2016 | Usui | ...................... B62M 25/08 |
| | | | 701/51 |
| 2017/0001687 A1* | 1/2017 | Usui | ...................... B62M 11/16 |
| 2017/0021896 A1* | 1/2017 | Tsuchizawa | ............. B62M 6/45 |
| 2017/0021897 A1* | 1/2017 | Bortolozzo | ............ B62J 45/412 |
| 2017/0341705 A1* | 11/2017 | Tsuchizawa | ............. B62M 6/55 |
| 2018/0257741 A1 | 9/2018 | Saruwatari | |
| 2019/0285172 A1* | 9/2019 | Maebashi | ............... F16H 59/70 |
| 2020/0324855 A1* | 10/2020 | Dasbach | .................. B62M 6/55 |
| 2020/0385088 A1* | 12/2020 | Fukumori | .............. B62M 9/123 |

FOREIGN PATENT DOCUMENTS

| | | |
|---|---|---|
| JP | H07-002164 A | 1/1995 |
| JP | H09-109983 A | 4/1997 |
| JP | H10-167162 A | 6/1998 |
| JP | H11-005583 A | 1/1999 |
| JP | 2001-039377 A | 2/2001 |
| JP | 2001-122183 A | 5/2001 |
| JP | 2015-223996 A | 12/2015 |
| JP | 2017-024532 A | 2/2017 |
| JP | 2019-517414 A | 6/2019 |

OTHER PUBLICATIONS

Nov. 24, 2020, International Search Opinion issued for related PCT application No. PCT/JP2020/034576.

Oct. 19, 2022, European Search Report issued for related EP Application No. 20862596.2.

* cited by examiner

VEHICLE AND METHOD FOR MONITORING ABNORMALITY OF POWER TRANSMISSION MECHANISM

CROSS REFERENCE TO PRIOR APPLICATION

This application is a National Stage Patent Application of PCT International Patent Application No. PCT/JP2020/034576 (filed on Sep. 11, 2020) under 35 U.S.C. § 371, which claims priority to Japanese Patent Application No. 2019-165698 (filed on Sep. 11, 2019), which are all hereby incorporated by reference in their entirety.

TECHNICAL FIELD

The present invention relates to a vehicle and a method for monitoring an abnormality of a power transmission mechanism.

BACKGROUND ART

An electric assist bicycle that assists a stepping force of a crank pedal with power of a motor is known (for example, Patent Literature 1). For an electric assist bicycle, an upper limit value of an assist force and an upper limit value of an assist ratio with respect to a vehicle speed are determined by regulations. For example, the determination is made by Japanese regulations as follows.

"In a case of making a bicycle travel at a speed of less than 24 kilometers per hour, a ratio of a force that supplements human power by using a prime mover to the human power is equal to or less than a value determined in (1) or (2), respectively, according to classification of speeds listed in (1) or (2).

(1) Speed lower than 10 kilometers per hour: 2

(2) Speed of 10 kilometers per hour or higher and lower than 24 kilometers per hour: The value obtained by subtracting 10 from the value that expresses a traveling speed in kilometers per hour, dividing the obtained value by 7, and then subtracting the value from 2."

In other words, according to Japanese regulations, as the upper limit value of the assist ratio with respect to the vehicle speed, as illustrated by the thick solid line in FIG. 8, the upper limit value of the assist ratio is 2 until the vehicle speed reaches 10 km/h, and it is required to gradually reduce the assist ratio from 2 to 0 while the vehicle speed is from 10 km/h to 24 km/h. It is assumed that the electric assist bicycle is sold as a complete vehicle. In other words, by selling the electric assist bicycle as a complete vehicle, the following features are provided.

(A) A torque sensor is embedded in an assist unit, and modification or repair is difficult. (B) The vehicle speed is estimated from the rotation speed, the gear ratio of transmission, and the circumferential length of the wheel, by embedding a pulsar in a wheel or a gear portion of a driving system. Here, it is difficult to change the wheel size (increase the diameter), and it is difficult to modify or repair the driving system.

In the complete vehicle, assuming such characteristics, it is guaranteed that the assist ratio does not deviate from the regulations by misrepresenting the vehicle speed.

Meanwhile, there is also an electric assist unit that can be retrofitted to an existing bicycle frame. For example, Patent Literature 2 describes an electric assist unit that can be retrofitted to an existing bicycle frame without making major design changes.

CITATION LIST

Patent Literature

Patent Literature 1: JP1999-005583A
Patent Literature 2: JP2001-039377A

SUMMARY OF INVENTION

Technical Problem

Naturally, it is necessary to comply with the regulations even for the electric assist unit that can be retrofitted. Since the torque sensor is embedded in the retrofitted electric assist unit, it seems to be hard to think of to change the assist force. Meanwhile, the retrofitted electric assist unit can easily change the relationship between the rotation speed of the motor or the crank and the vehicle speed by changing the setting of the bicycle, which is an attachment target, or the electric assist unit. Accordingly, there is a concern that compliance with the regulations of the assist ratio cannot be guaranteed. It is not limited to the electric bicycle and can occur even in a vehicle of which the assist ratio with respect to vehicle speed is determined by regulations.

The present invention provides a vehicle that can comply with the assist ratio with respect to the vehicle speed even in a case where the entirety or a part of the power transmission mechanism is retrofitted or replaced, and a method for monitoring an abnormality of a power transmission mechanism that can determine a state where the vehicle does not comply with the regulations due to retrofitting or replacement of the entirety or a part of the power transmission mechanism.

Solution to Problem

According to a first aspect of the present invention, there is provided a vehicle including: an input unit to which power for driving the vehicle is input; an output unit that outputs the power input to the input unit; and a power transmission mechanism that transmits the power input to the input unit to the output unit, in which an abnormality of the power transmission mechanism is determined or driving performed by using the power transmission mechanism is prevented or prohibited based on first gear ratio-related information, which is information acquired at a first time and related to a gear ratio of a transmission section which is the entirety or a part of the power transmission mechanism, and second gear ratio-related information, which is information acquired at a second time subsequent to the first time and related to a gear ratio of the transmission section.

According to a second aspect of the present invention, there is provided a vehicle including: an input unit to which power for driving the vehicle is input; an output unit that outputs the power input to the input unit; and a power transmission mechanism that transmits the power input to the input unit to the output unit, in which an abnormality of the power transmission mechanism is determined or driving performed by using the power transmission mechanism is prevented or prohibited based on first speed information, which is a speed of the vehicle acquired in advance and obtained based on a gear ratio of a transmission section which is the entirety or a part of the power transmission mechanism and a rotation state amount of the input unit, and second speed information, which is a speed of the vehicle acquired without using the gear ratio.

According to a third aspect of the present invention, there is provided a method for monitoring an abnormality of a power transmission mechanism installed in a vehicle, the method including: a step of acquiring first gear ratio-related information, which is information related to a gear ratio of a transmission section which is the entirety or a part of the power transmission mechanism, at a first time; a step of acquiring second gear ratio-related information, which is information related to a gear ratio of the transmission section, at a second time subsequent to the first time; and a step of determining an abnormality of the power transmission mechanism or preventing or prohibiting driving performed by using the power transmission mechanism based on the first gear ratio-related information and the second gear ratio-related information.

Advantageous Effects of Invention

According to the present invention, by determining the abnormality of the entirety or a part of the power transmission mechanism, or by preventing or prohibiting the driving performed by using the entirety or a part of the power transmission mechanism, it is possible to avoid a state where the vehicle does not comply with the regulations.

DESCRIPTION OF EMBODIMENTS

Hereinafter, an electric bicycle as an embodiment of the vehicle of the present invention will be described with reference to the drawings.

<Vehicle Structure>

Figure 1:
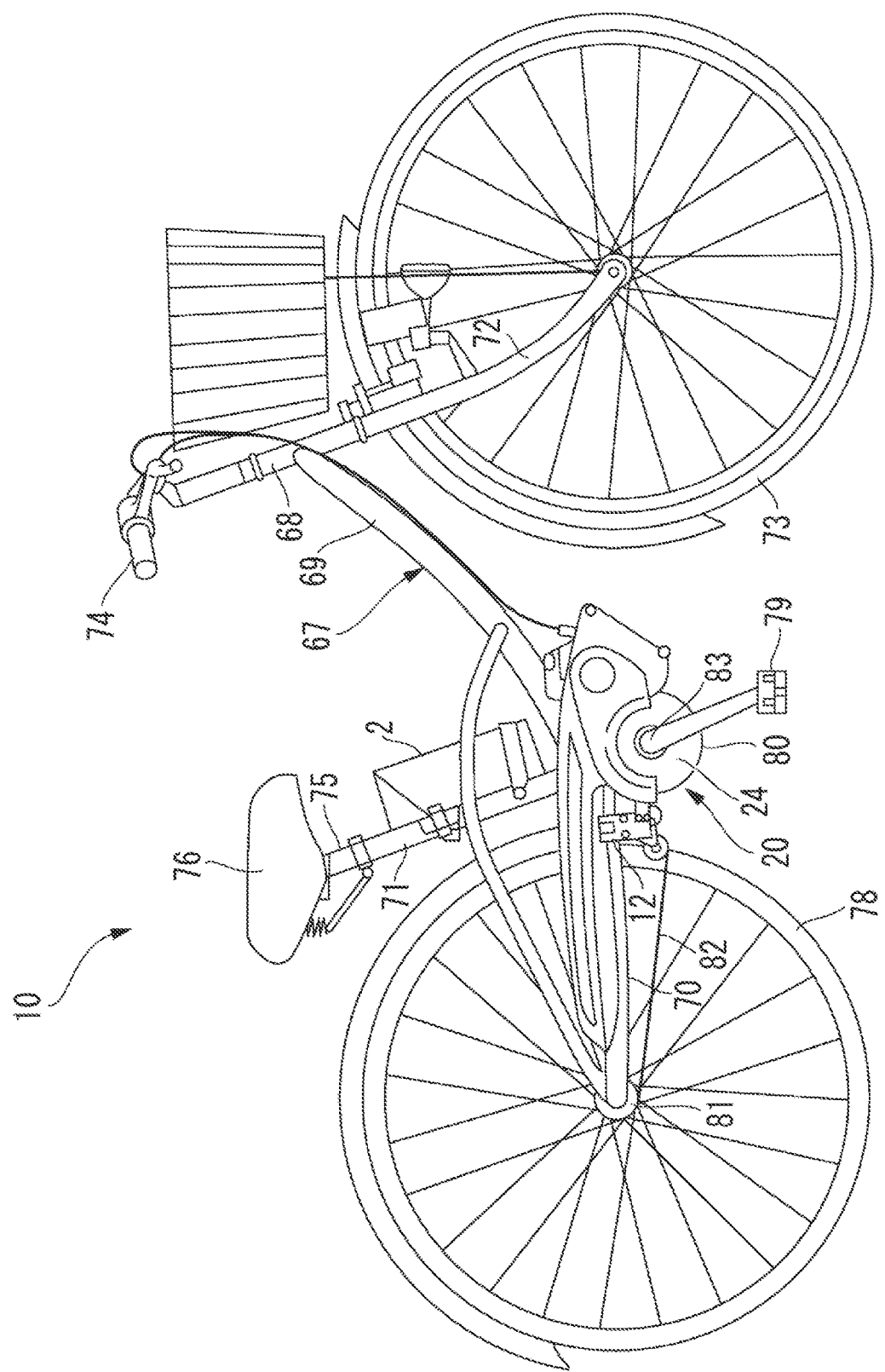
FIG. 1 is a side view of an electric bicycle according to an embodiment of the present invention.

As illustrated in FIG. 1, an electric bicycle 10 is an electric assist bicycle including a front wheel 73, a rear wheel 78, a bicycle frame 67, a battery 2, and an electric assist unit 20 that generates an assist force by electric power supplied by the battery 2, and configured such that an assist force generated by the electric assist unit 20 can be output.

The bicycle frame 67 includes: a head pipe 68 at the front end; a down pipe 69 extending rearward from the front of a vehicle body obliquely to the rear side from the head pipe 68; a support pipe 66 (refer to FIG. 2) fixed to the rear end of the down pipe 69 and extending to the left and right; a seat post 71 that rises upward from the support pipe 66; and a pair of left and right rear forks 70 extending rearward from the support pipe 66.

A front fork 72 is supported to be steerable by the head pipe 68, and the front wheel 73 is pivotally supported at the lower end of the front fork 72. A steering handle 74 is provided at the upper end of the front fork 72. The rear wheel 78 as a driving wheel is pivotally supported between the rear ends of the pair of left and right rear forks 70 extending rearward from the seat post 71. A support shaft 75 having a seat 76 at the upper end is mounted on the seat post 71 such that the vertical position of the seat 76 can be adjusted.

The battery 2 that supplies electric power to the electric assist unit 20 is fixed to the front portion of the seat post 71 below the seat 76 to be attachable and detachable.

A pair of crank pedals 79 is connected to the left end and the right end of a crankshaft 83 that coaxially penetrates the support pipe 66 of the bicycle frame 67. The stepping force applied to the crank pedal 79 is transmitted to the crankshaft 83 and input to an endless chain 82 via a driving sprocket 80. The chain 82 is wound around the driving sprocket 80 and a driven sprocket 81 provided on the axle of the rear wheel 78.

Figure 2:
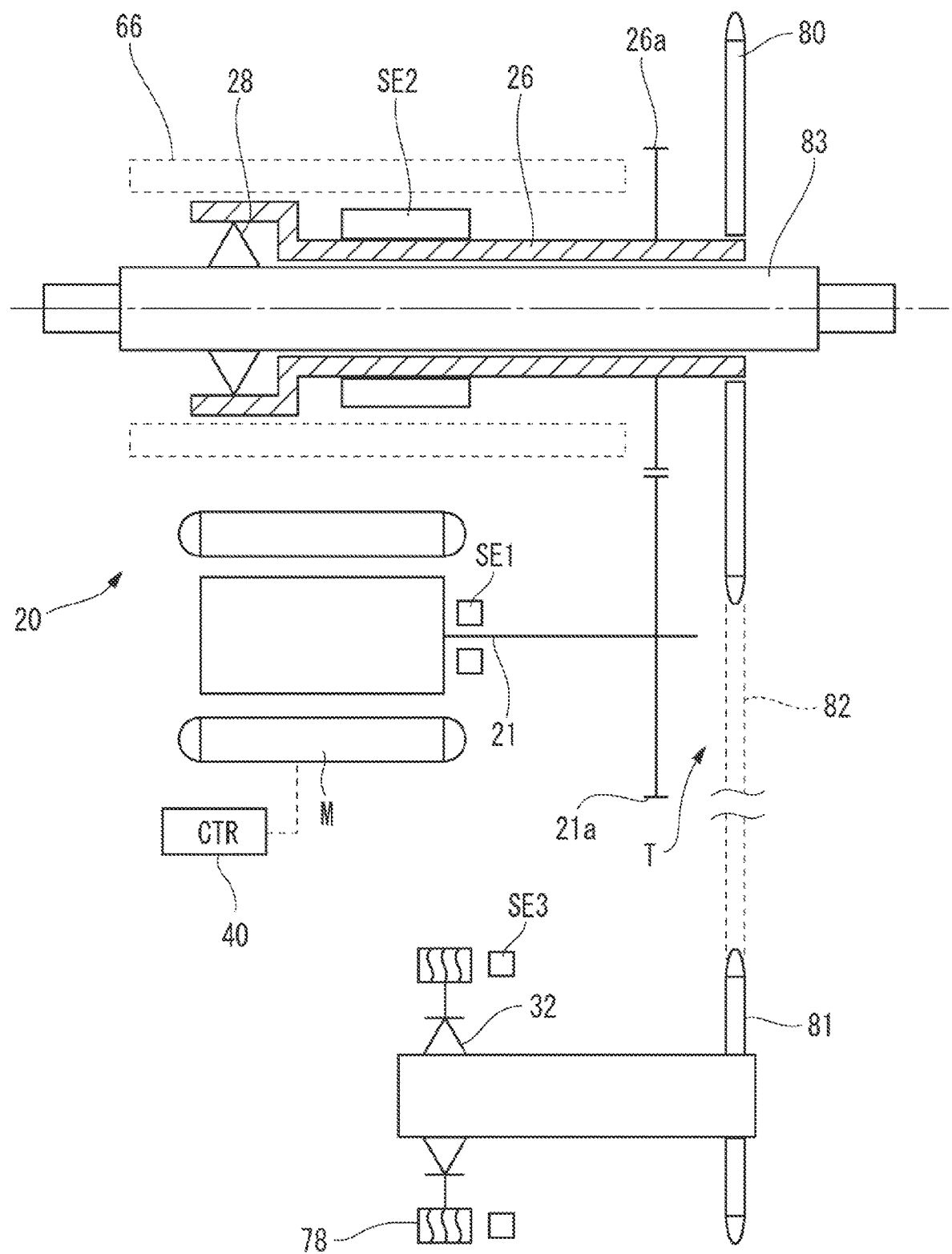
FIG. 2 is a schematic view of a power transmission mechanism including an electric assist unit according to the embodiment.

As illustrated in FIGS. 1 and 2, the electric assist unit 20 is configured such that the motor M and the crankshaft 83 are unitized and can be retrofitted around the support pipe 66 of the bicycle frame 67. Therefore, the user takes the non-electric bicycle already owned or newly owned to a specific manufacturer, seller, or repairer (hereinafter, referred to as a manufacturer or the like), the manufacturer or the like removes the existing crankshaft and attaches the electric assist unit 20 and the battery 2, and accordingly, the non-electric bicycle can be electrified. The user may borrow the bicycle retrofitted with electric assist unit 20 and electrified from the owner, and use the bicycle.

In the electric assist unit 20, an output shaft 21 of a motor M and the crankshaft 83 are disposed in parallel inside a case 24. The crankshaft 83 is rotatably supported inside a tubular sleeve 26 via a first one-way clutch 28, and a driven gear 26a that meshes with a motor output gear 21a provided on the output shaft 21 of the motor M and the driving sprocket 80 are fixed to the outer circumferential side of the sleeve 26. Therefore, the torque of the motor M is transmitted to the driving sprocket 80 via the motor output gear 21a, the driven gear 26a, and the sleeve 26.

A second one-way clutch 32 is provided between the driven sprocket 81 and the rear wheel 78.

In the electric bicycle 10 configured as such, in a case where the crank pedal 79 is rowed in a forward direction (also referred to as a positive rotation direction), the first one-way clutch 28 is engaged, and the positive rotation power of the crankshaft 83 is transmitted to the driving sprocket 80 via the sleeve 26, and transmitted further to the driven sprocket 81 via the chain 82. Here, the second one-way clutch 32 is also engaged, and accordingly, the positive rotation power transmitted to the driven sprocket 81 is transmitted to the rear wheel 78.

Meanwhile, in a case where the crank pedal 79 is rowed in a rearward direction (also referred to as a reverse rotation direction), the first one-way clutch 28 is not engaged, the reverse rotation power of the crankshaft 83 is not transmitted to the sleeve 26, and the crankshaft 83 spins.

For example, similar to a case of pushing the electric bicycle 10 in the forward direction, in a case where the positive rotation power in the forward direction (positive rotation direction) is input from the rear wheel 78, the second one-way clutch 32 is not engaged, and the positive rotation power of the rear wheel 78 is not transmitted to the driven sprocket 81. Therefore, the rear wheel 78 rotates relative to the driven sprocket 81. Meanwhile, similar to a case of pushing the electric bicycle 10 in the rearward direction, in a case where the reverse rotation power in the rearward direction (reverse rotation direction) is input from the rear wheel 78, the second one-way clutch 32 is engaged, and the reverse rotation power of the rear wheel 78 is not transmitted to the driven sprocket 81, and transmitted further to the driving sprocket 80 via the chain 82. Since the first one-way clutch 28 is also engaged here, the reverse rotation power transmitted to the driving sprocket 80 is transmitted to the crankshaft 83 and the crank pedal 79, and the crankshaft 83 and the crank pedal 79 reversely rotate.

The electric assist unit 20 is provided with a motor rotation speed sensor SE1 that detects the rotation speed of the motor M. The sleeve 26 is provided with a torque sensor SE2 that detects a torque value Tq generated by a force (hereinafter, pedal stepping force) with which the driver steps on the crank pedal 79. The motor rotation speed sensor SE1 includes a magnet and a hall IC provided on the outer circumferential portion of the output shaft 21 of the motor M. The torque sensor SE2 includes a magnetostriction-type torque sensor arranged on the outer circumferential portion of the sleeve 26. In the present embodiment, for the simplicity of description, the gear ratio between the motor output gear 21a and the driven gear 26a is set to 1, and the rotation speed of the motor M and the rotation speed of the sleeve 26 always match each other. Therefore, the output value of the motor rotation speed sensor SE1 can be regarded as the rotation speed of the sleeve 26. The rear wheel 78 is provided with a rear wheel rotation speed sensor SE3 that acquires the rotation speed of the rear wheel 78.

A control device 40 that controls the electric assist unit 20 includes a motor control unit 41 (refer to FIGS. 3 to 5) that controls the motor M, and the motor control unit 41 calculates the force (hereinafter, referred to as the pedal stepping force) with which the driver steps on the crank pedal 79 from the torque value Tq that is an output value of the torque sensor SE2, and controls the motor M with PWM-control (Pulse Width Modulation control) method such that the assist force determined by the pedal stepping force and the assist ratio according to the vehicle speed of the electric assist bicycle 1 is generated.

Here, the relationship between the rotation speeds of each member of the electric bicycle 10 and the gear ratio will be described.

In general, the gear ratio is the rotation speed of the output unit with respect to the rotation speed of the input unit. In the electric bicycle 10, the rotation speed of the input unit is the rotation speed of the sleeve 26, and the rotation speed of the output unit is the rotation speed of the rear wheel 78. In the present embodiment, since the gear ratio between the motor output gear 21a and the driven gear 26a is 1, the rotation speed of the sleeve 26 is equal to the rotation speed of the motor M detected by the motor rotation speed sensor SE1.

The rotation speed of the sleeve 26 is equal to the rotation speed of the crankshaft 83 in a state where the first one-way clutch 28 is engaged.

The speed of the rotation of the sleeve 26 is changed by the difference in the outer diameter between the driving sprocket 80 and the driven sprocket 81, and further changed by a switching transmission device 30 provided between the driven sprocket 81 and the rear wheel 78. A power transmission mechanism T is formed that transmits the power input to the sleeve 26 to the rear wheel 78.

When the rotation speed of the sleeve 26, which is the rotation speed of the input unit, is Ni [rpm], the rotation speed of the rear wheel 78, which is the rotation speed of the output unit, is No [rpm], the gear ratio between the driving sprocket 80 and the driven sprocket 81 is Rg, and the gear ratio of the switching transmission device 30 is Rt, the rotation speed No [rpm] of the rear wheel 78 is expressed by the following equation (1), $$No\ [rpm] = Ni\ [rpm] \times Rg \times Rt \quad (1)$$

In the equation (1), when the outer diameter of the driving sprocket 80 is D [m] and the outer diameter of the driven sprocket 81 is d [m], the gear ratio Rg between the driving sprocket 80 and the driven sprocket 81 is expressed by the following equation (2).

$$Rg = \pi D / \pi d = D/d \quad (2)$$

The gear ratio Rt of the switching transmission device 30 is appropriately set.

When the gear ratio (hereinafter, referred to as a composite gear ratio) of the power transmission mechanism T is Rc, the composite gear ratio Rc is expressed by the multiplication of the gear ratio Rg of the driving sprocket 80 and the driven sprocket 81 and the gear ratio Rt of the switching transmission device 30, as illustrated in the equation (3). As in the present embodiment, in the electric bicycle 10 in which the switching transmission device 30 is not provided, Rt=1.

$$Rc = Rg \times Rt \quad (3)$$

When the equation (1) is rewritten using the equation (3), the rotation speed No [rpm] of the rear wheel 78 is expressed by the following equation (4) by using the rotation speed Ni [rpm] of the sleeve 26 and the composite gear ratio Rc of the power transmission mechanism $$No\ [rpm] = Ni\ [rpm] \times Rc \quad (4)$$

When using the rotation speed No [rpm] of the rear wheel 78 of the equation (4) and a circumferential length Ct [m] of the rear wheel 78, the speed (hereinafter, referred to as the vehicle speed) No' [km/h] of the electric bicycle 10 is expressed by the following equation (5).

$$No'\ [km/h] = Ni\ [rpm] \times Rc \times Ct\ [m] \times 60/1000 \quad (5)$$

Assuming that the distance (hereinafter, referred to as an advancing distance) traveled by the electric bicycle 10 while the sleeve 26, which is the input unit, makes one rotation is L [m], the advancing distance L [m] is expressed by the following equation (6).

$$L\ [m] = Rc \times Ct\ [m] \qquad (6)$$

Figure 8:
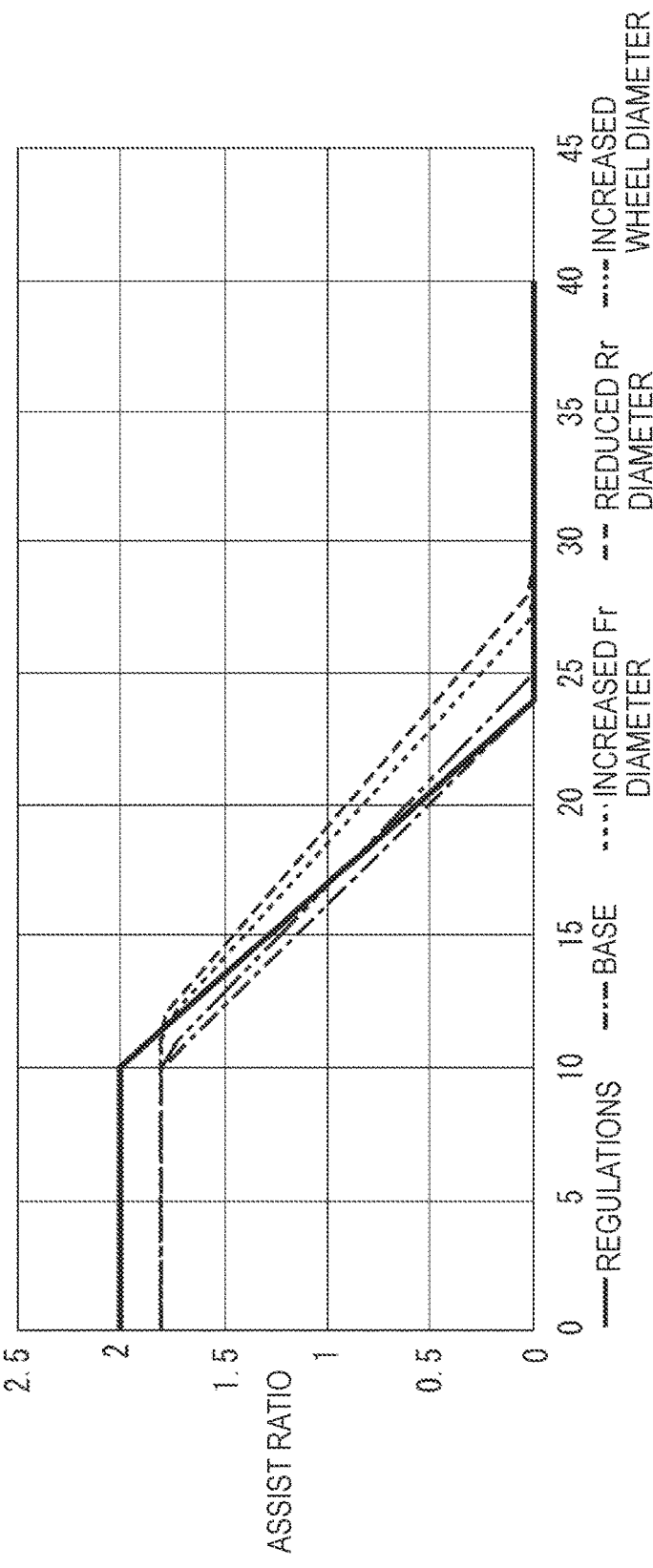
FIG. 8 is a graph illustrating a relationship between an assist ratio of an electric assist bicycle and a vehicle speed.

In a case of assuming the electric bicycle (base of FIG. 8) which is a reference illustrated in FIG. 8, the number of teeth (front cogs) of the driving sprocket 80 is 44, the number of teeth (rear cogs) of the driven sprocket 81 is 13, and thus, the composite gear ratio Rc is 3.38, and the rotation speed No [rpm] of the rear wheel 78 of the equation (4) is expressed by the following equation (7).

$$No\ [rpm] = Ni\ [rpm] \times 3.38 \qquad (7)$$

The circumferential length Ct of the rear wheel 78 of the electric bicycle (base of FIG. 8) which is a reference illustrated in FIG. 8 is $2096 \times 10^{-3}$ [m], and thus, the vehicle speed No' [km/h] of the electric bicycle 10 of the equation (5) is expressed by the following equation (8).

$$No'[km/h] = Ni\ [rpm] \times 3.38 \times (2096 \times 10^{-3}\ [m]) \times 60/1000 \qquad (8)$$

The composite gear ratio Rc of the electric bicycle (base of FIG. 8) which is a reference illustrated in FIG. 8 is 3.38, and the circumferential length Ct of the rear wheel 78 is $2096 \times 10^{-3}$ [m], and thus, the advancing distance L [m] traveled by the electric bicycle 10 while the sleeve 26 of the electric bicycle 10 makes one rotation in the equation (6) is expressed by the following equation (9).

$$L\ [m] = 3.38 \times 2096 \times 10^{-3}\ [m] \approx 7084 \times 10^{-3} \qquad (9)$$

Figure 10:
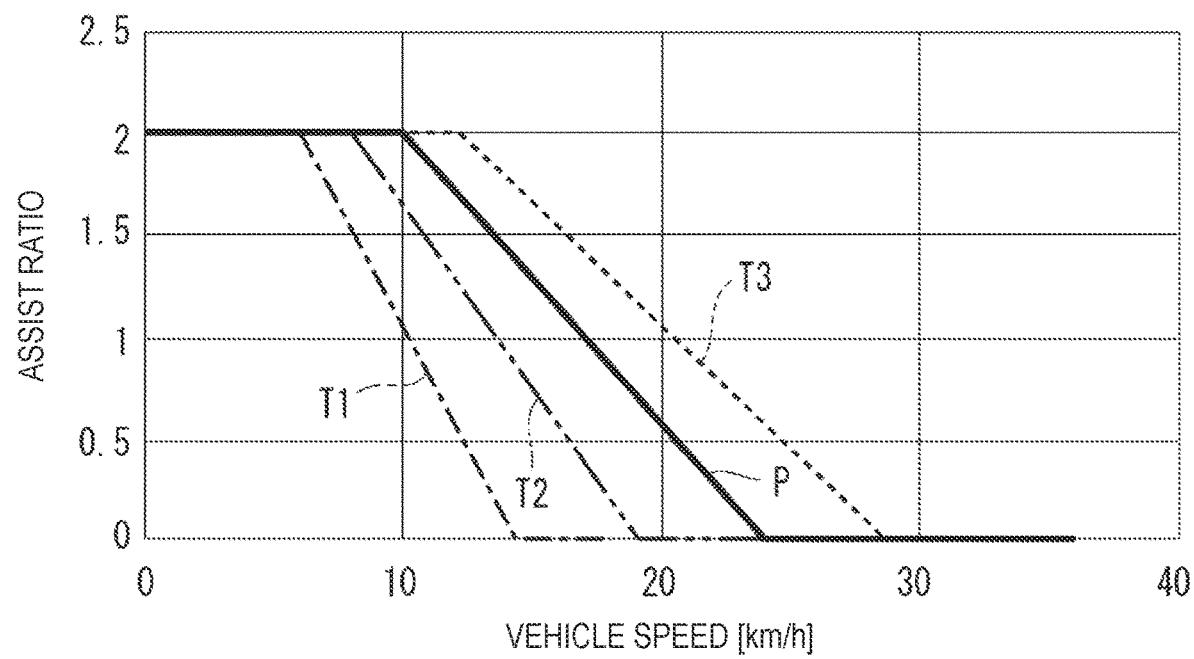
FIG. 10 is a graph describing an influence on the assist ratio of the electric assist bicycle in a switching transmission device.

The motor control unit 41 is pre-programmed by the manufacturer or the like such that the electric bicycle 10 complies with the regulations. According to Japanese regulations, as illustrated by the solid line (the same applies to a solid line P in FIG. 10) in FIG. 8, the upper limit value of the assist ratio until the vehicle speed reaches 10 [km/h] is 2, and it is required to gradually reduce the assist ratio from 2 to 0 while the vehicle speed is from 10 [km/h] to 24 [km/h]. For example, as illustrated in FIG. 8, the motor control unit 41 of the control device 40 is programmed to achieve the assist ratio illustrated by the one-dot chain line (base of FIG. 8) to not exceed the Japanese regulations (solid line). In the example illustrated by the one-dot chain line in FIG. 8, a predetermined margin width (margin) is set to be ensured with respect to the upper limit of the assist ratio in the region of less than 10 [km/h] and the region of 10 [km/h] to 24 [km/h].

However, unlike the complete vehicle in which the electric assist unit 20 is preliminarily incorporated, in the electric bicycle 10 to which the electric assist unit 20 is retrofitted, modification or repair is relatively easy, and a state where the electric bicycle 10 erroneously does not comply with the regulations is assumed. For example, the diameter of the driving sprocket 80 is increased (increased Fr diameter in FIG. 8), the diameter of the driven sprocket 81 is reduced (reduced Rr diameter in FIG. 8), the diameter of the rear wheel 78 is increased (increased wheel diameter in FIG. 8), and accordingly, there is a concern that a state where the electric bicycle does not comply with the regulations is made.

In order to avoid a case where such a state where the electric bicycle 10 does not comply with the regulations is left unattended, a state where the electric bicycle 10 does not comply with the regulations is monitored by the abnormality determining process of the power transmission mechanism illustrated below.

<Control Device>

Figure 3:
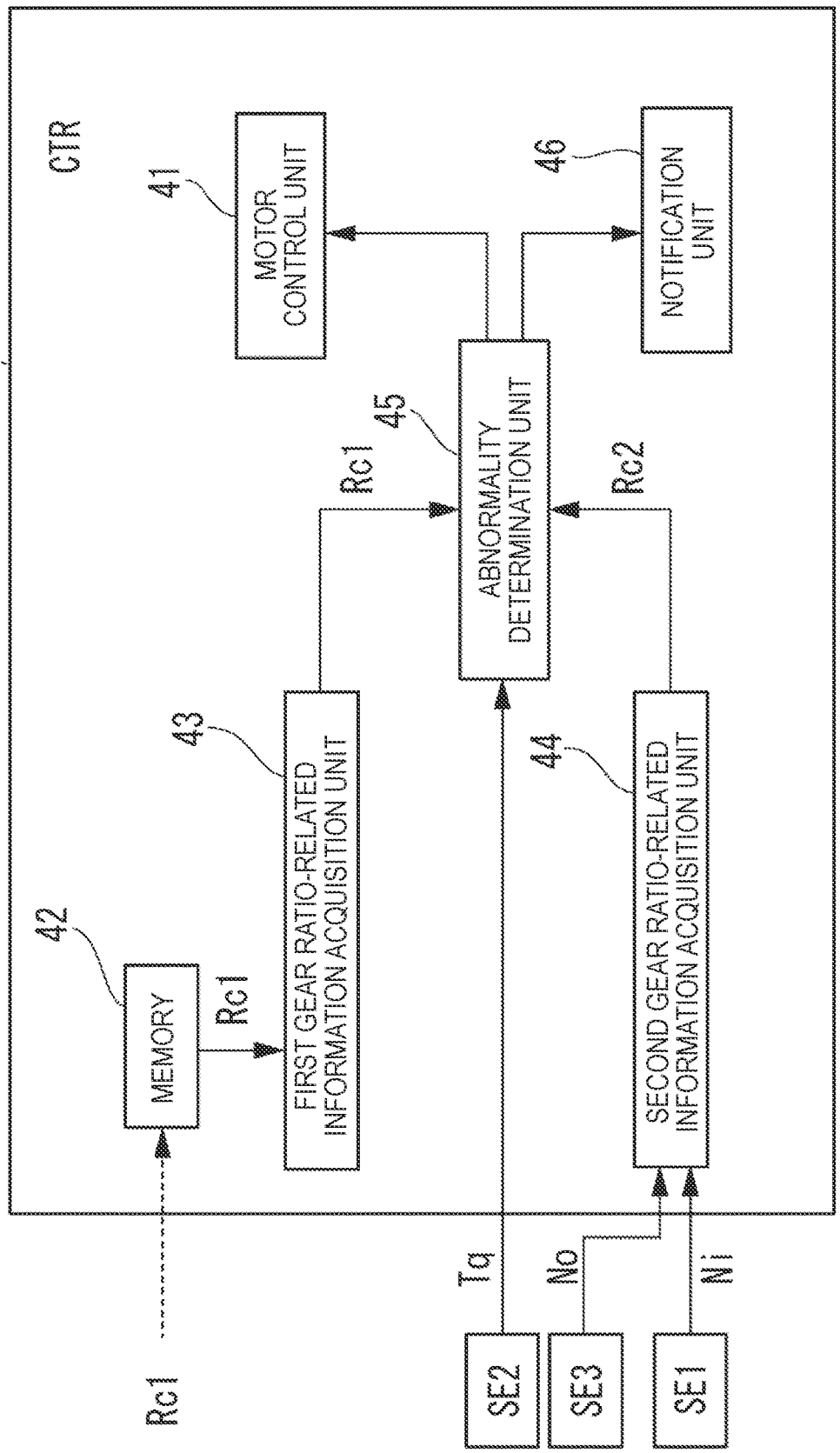
FIG. 3 is a functional block diagram of a control device according to a first example.
Figure 4A:
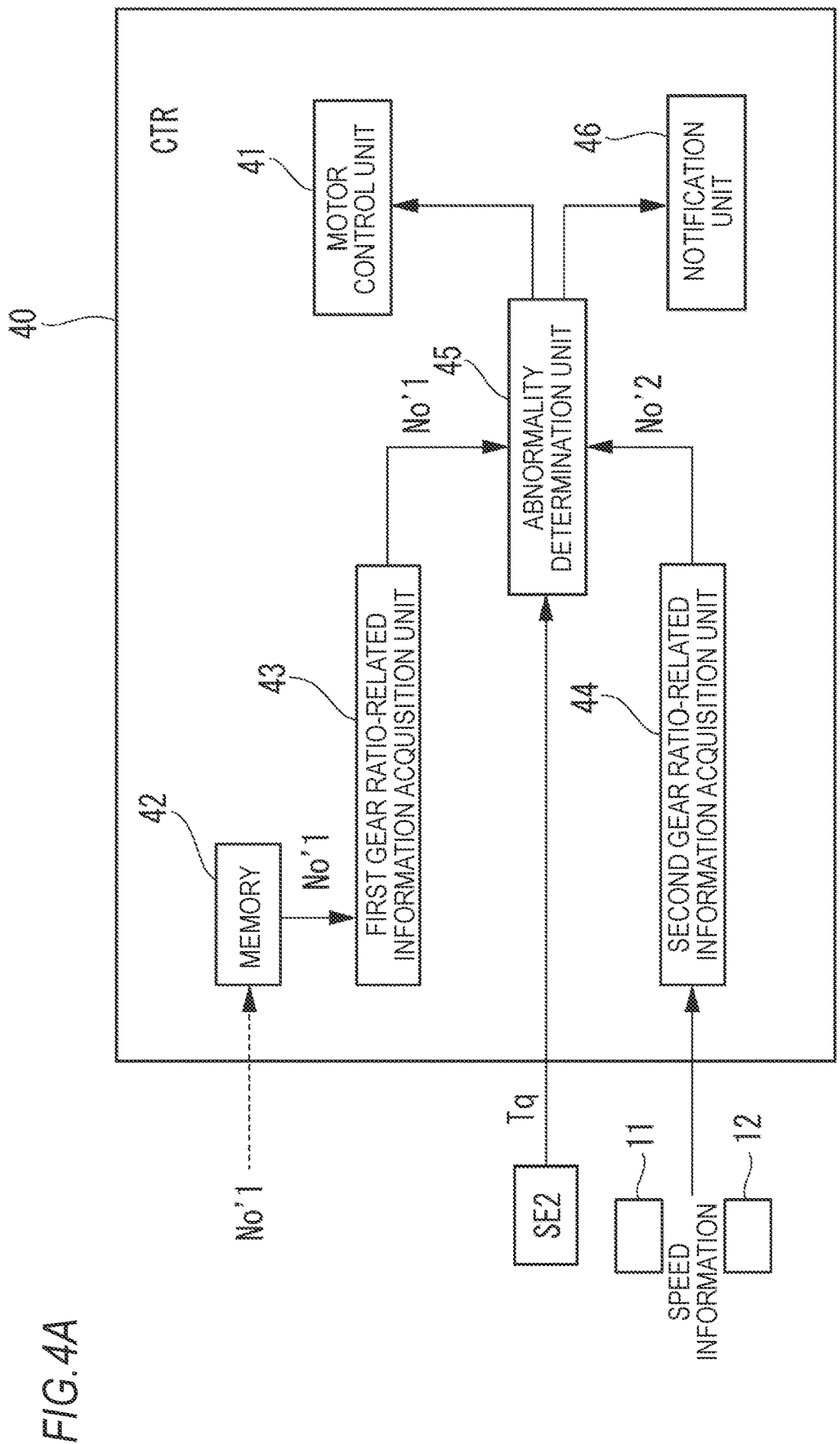
FIG. 4A is a functional block diagram of a control device according to a second example.
Figure 4B:
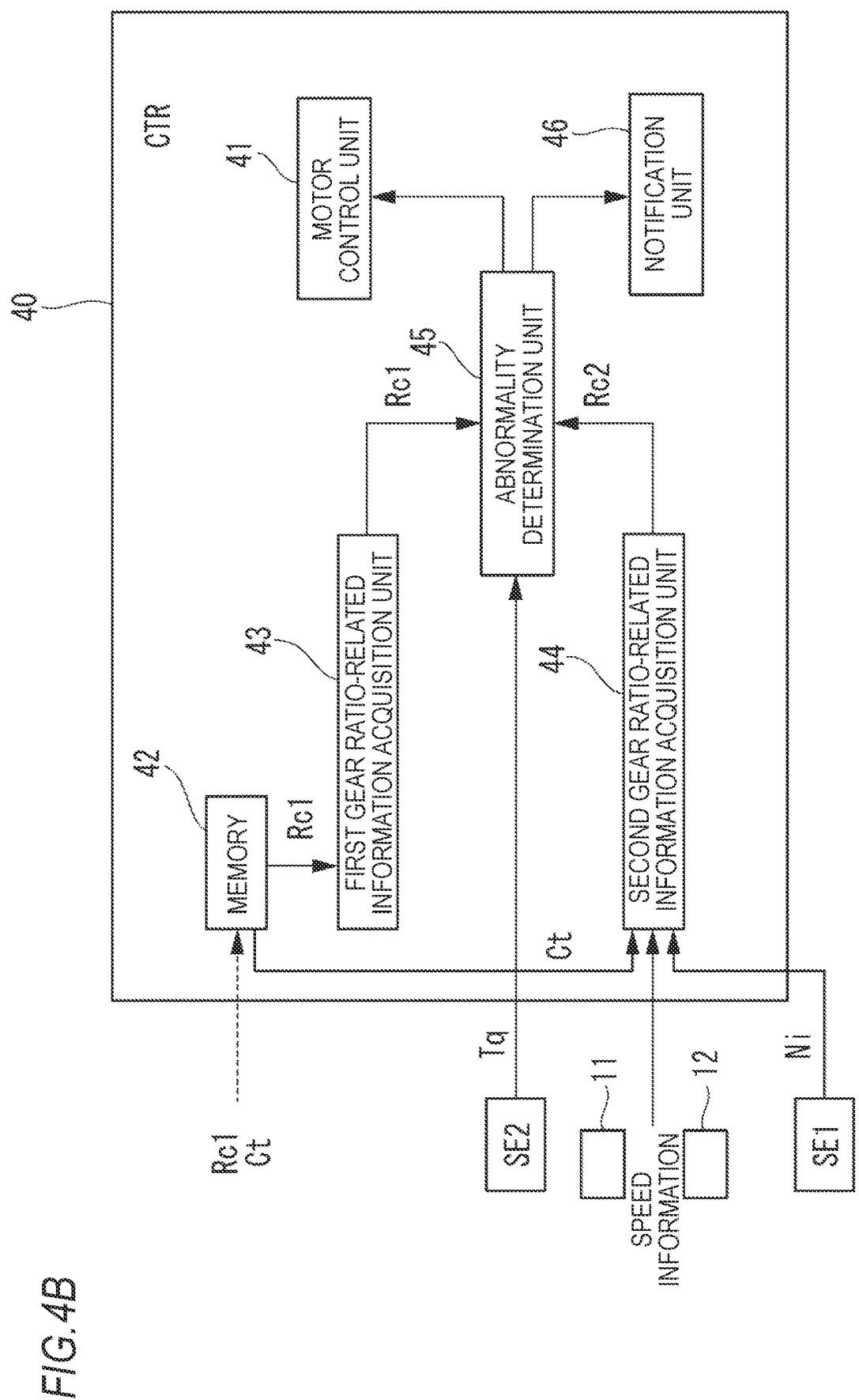
FIG. 4B is a functional block diagram of a control device according to a modification example of the second example.
Figure 5:
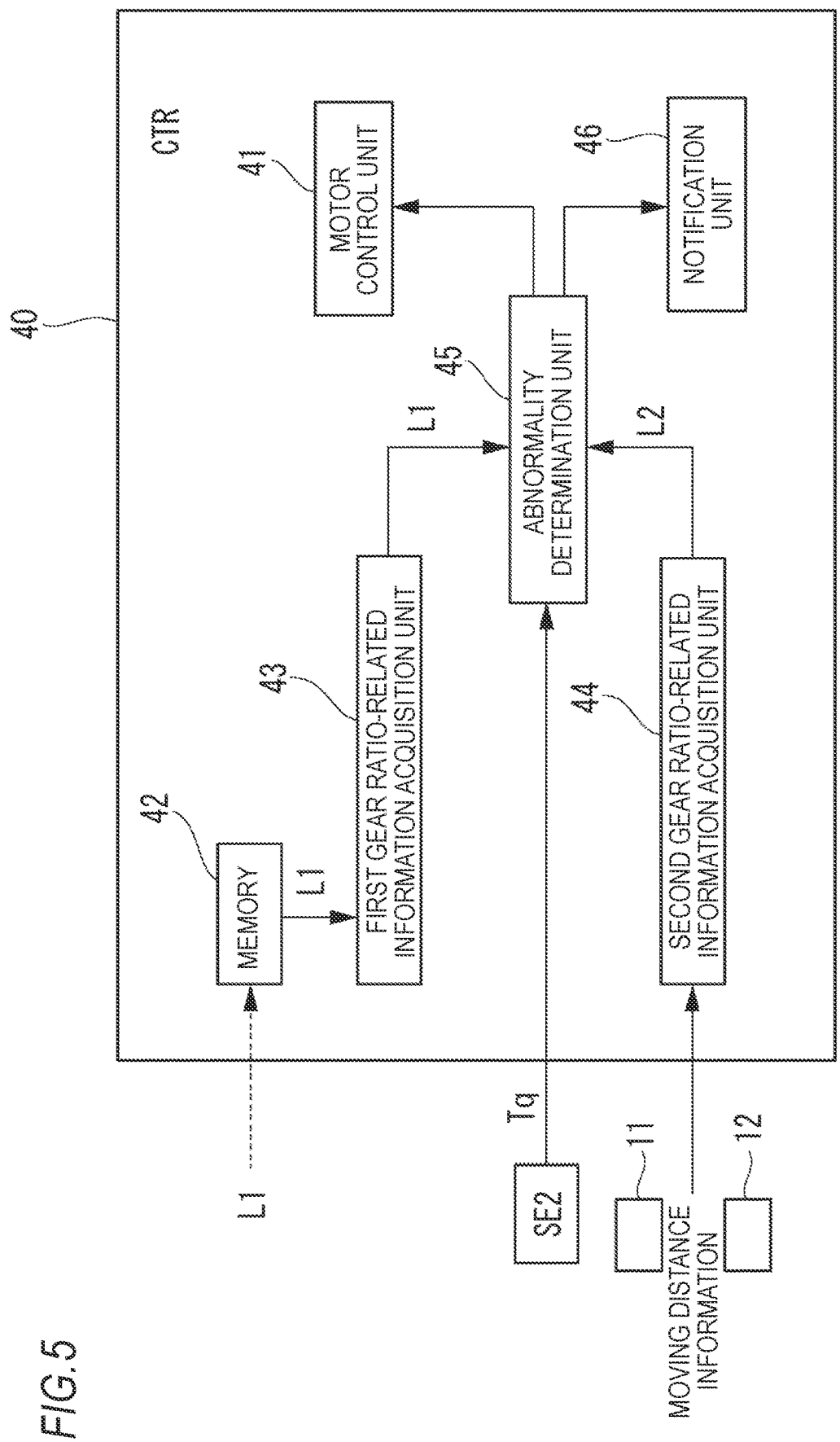
FIG. 5 is a functional block diagram of a control device according to a third example.

As illustrated in FIGS. 3 to 5, the control device 40 that performs the abnormality determining process includes: the above-described motor control unit 41; a memory 42 that stores first gear ratio-related information, which is information acquired when assembling the electric assist unit 20 (hereinafter, referred to as "during the assembling"), that is, at a first time, and related to the gear ratio of the transmission section which is the entirety of the power transmission mechanism T; a first gear ratio-related information acquisition unit 43 that acquires the first gear ratio-related information from the memory 42; a second gear ratio-related information acquisition unit 44 that acquires the second gear ratio-related information, which is information related to the gear ratio of the transmission section after a predetermined time (hereinafter, after the assembly) from the time of assembling the electric assist unit 20, that is, at a second time; an abnormality determination unit 45 that determines an abnormal state of the power transmission mechanism T; and a notification unit 46 that notifies an abnormal state or the like of the power transmission mechanism T. The acquisition is a concept that includes obtainment, calculation, estimation, and detection.

First Example

FIG. 3 is a functional block diagram of a first example. In the first example, the above-described composite gear ratio Rc is used as the first gear ratio-related information and the second gear ratio-related information.

In the first example, the composite gear ratio Rc (hereinafter, the composite gear ratio Rc at the time of assembly is referred to as a reference composite gear ratio Rc1) of the power transmission mechanism T is stored in the memory 42 by the manufacturer or the like when assembling the electric assist unit 20. The reference composite gear ratio Rc1 is obtained by the above-described equation (4). In other words, the reference composite gear ratio Rc1 is calculated from the rotation speed Ni [rpm] of the input unit and the rotation speed No [rpm] of the output unit when assembling the electric assist unit 20. The rotation speed Ni [rpm] of the input unit and the rotation speed No [rpm] of the output unit are detected by the rotation speed sensor or the like. In the following description, the rotation speed of the motor M is used as the rotation speed Ni [rpm] of the input unit, and the rotation speed of the rear wheel 78 is used as the rotation speed No [rpm] of the output unit. In the present embodiment, the rotation speed of the motor M is detected by the motor rotation speed sensor SE1, and the rotation speed of the rear wheel 78 is detected by the rear wheel rotation speed sensor SE3.

The first gear ratio-related information acquisition unit 43 acquires the reference composite gear ratio Rc1 from the memory 42. The second gear ratio-related information acquisition unit 44 acquires the rotation speed Ni [rpm] of the motor M and the rotation speed No [rpm] of the rear wheel 78, which is the rotation speed of the output unit, after assembling the electric assist unit 20, and calculates the composite gear ratio Re (hereinafter, the composite gear ratio Re after assembling the electric assist unit 20 is referred to as a current composite gear ratio Rc2) of the power transmission mechanism T.

The abnormality determination unit 45 compares the reference composite gear ratio Rc1 acquired by the first gear ratio-related information acquisition unit 43 with the current composite gear ratio Rc2 calculated by the second gear ratio-related information acquisition unit 44, and determines the abnormality of the power transmission mechanism T in a case where the composite gear ratio Rc2 is larger than the reference composite gear ratio Rc1. Here, the torque value Tq detected by the torque sensor SE2 is input to the abnormality determination unit 45. The abnormality determination unit 45 does not perform the abnormality determination in a case where the torque value is zero. It is because the gear ratio of the power transmission mechanism T cannot be accurately acquired when the abnormality determination of the electric assist unit 20 is performed when the torque due to the pedal stepping force or the driving force of the motor M does not act. When the torque value Tq of the torque sensor SE2 is larger than zero, the determination accuracy can be improved by performing the abnormality determination or the like of the power transmission mechanism T.

The torque value Tq of the torque sensor SE2 may be larger than zero, and at least one of the pedal stepping three and the driving force of the motor M does not necessarily have to be transmitted to the rear wheel 78, and may be output to the extent that the second one-way clutch 32 is engaged. Conversely, during the abnormality determining process, the control device 40 may control the motor M such that the driving force is output from the motor M to the extent that the second one-way clutch 32 is engaged.

When an abnormality exists such as a case where the power transmission mechanism T does not comply with the regulations, the notification unit 46 displays a caution to the driver or notifies the manufacturer or the owner. By displaying the caution to the driver, the driver can recognize a state where the power transmission mechanism T does not comply with the regulations. By notifying the manufacturer or the owner, the manufacturer or the owner can recognize that it is possible that the modification or repair caused a state where the power transmission mechanism T does not comply with the regulations. The notification unit 46 warns the driver and/or notifies the manufacturer or the owner not only when the above-described abnormality of the power transmission mechanism T exists but also when the current composite gear ratio Rc2 is smaller than the reference composite gear ratio Rc1.

The motor control unit 41 can prevent or prohibit the driving of the motor M when there is an abnormality such as a case where the power transmission mechanism T does not comply with the regulations. By preventing or prohibiting the driving of the motor M, it is possible to avoid traveling in a state where the electric bicycle 10 does not comply with the regulations. Preventing the driving of the motor M means, for example, controlling such that only a small driving force can be output from the motor M. The motor control unit 41 may perform control to output the driving force from the motor M within a range that does not deviate from the regulations, based on the current composite gear ratio Rc2.

Second Example

FIG. 4A is a functional block diagram of a second example. In the second example, the above-described vehicle speed No' [km/h] is used as the first gear ratio-related information and the second gear ratio-related information.

In the second example, the vehicle speed No' [km/h] (hereinafter, the vehicle speed No' at the time of assembly is referred to as a reference vehicle speed No'1) is stored in the memory 42 by the manufacturer or the like when assembling the electric assist unit 20. The reference vehicle speed No'1 is obtained by the above-described equation (5). In other words, the reference vehicle speed No'1 is calculated from the rotation speed Ni [rpm] (hereinafter, the rotation speed of the motor M at this time is referred to as Ni1 [rpm]) of the motor M, the reference composite gear ratio Rc1 of the power transmission mechanism T, and the circumferential length Ct [m] of the rear wheel 78. Similar to the first example, the reference composite gear ratio Rc1 is calculated from the rotation speed Ni [rpm] of the motor M and the rotation speed No [rpm] of the rear wheel 78 based on the equation (4).

The first gear ratio-related information acquisition unit 43 acquires the reference vehicle speed No'1 [km/h] from the memory 42. The second gear ratio-related information acquisition unit 44 acquires an actual vehicle speed No'2 [km/h], which is an actual vehicle speed of the electric bicycle 10 when the rotation speed of the motor M is Ni1 [rpm], as vehicle speed information after assembling the electric assist unit 20. The actual vehicle speed No'2 [km/h] can be acquired from a receiver 11 in a case where the electric bicycle 10 is provided with the receiver 11 that acquires the speed information transmitted from the global positioning system (GPS). The actual vehicle speed No'2 [km/h] can also be acquired from the speed information transmitted from the GPS using the mobile terminal owned by the driver. The actual vehicle speed No'2 [km/h] may be acquired from the speed information obtained from the measuring device 12 in a case where the measuring device 12 such as a cycle computer is installed in the electric bicycle 10, instead of the speed information obtained from the GPS. In other words, the actual vehicle speed No'2 [km/h] is the vehicle speed No' [km/h] acquired without using the reference vehicle speed No'1 [km/h].

The abnormality determination unit 45 compares the reference vehicle speed No'1 [km/h] acquired by the first gear ratio-related information acquisition unit 43 with the actual vehicle speed No'2 [km/h] acquired by the second gear ratio-related information acquisition unit 44, and determines the abnormality of the power transmission mechanism T in a case where the actual vehicle speed No'2 [km/h] is higher than the reference vehicle speed No'1 [km/h]. The abnormality determination unit 45 is the same as that of the first example in that the torque value Tq detected by the torque sensor SE2 is input and the abnormality determination is not performed in a case where the torque value is zero. The functions of the notification unit 46 and the motor control unit 41 are the same as those of the first example. In a case where the vehicle speed No' [km/h] is used as the first gear ratio-related information and the second gear ratio-related information, the vehicle speed No' [km/h] also includes the component of the circumferential length Ct of the rear wheel 78, and thus, it is possible to determine both the abnormality caused by the increased diameter of the rear wheel 78 and the abnormality caused by the reduced diameter of the rear wheel 78.

(Modification Example of Second Example)

FIG. 4B is a functional block diagram of a modification example of the second example. In the above-described second example, it is necessary for the second gear ratio-related information acquisition unit 44 to acquire the actual vehicle speed No'2 [km/h], which is the actual vehicle speed of the electric bicycle 10, when the rotation speed of the motor M is Ni1 [rpm] after assembling the electric assist unit 20, which is the same time as the time when the reference vehicle speed No'1 [km/h] is calculated. However, the second gear ratio-related information acquisition unit 44 can acquire the current composite gear ratio Rc2 from the following equation (10) which is a modification of the above-described equation (5) regardless of the rotation speed Ni [rpm] of the motor M after assembling the electric assist unit 20.

$$Rc = No'[\text{km/h}] \times 1/Ni \ [rpm] \times 1/Ct \ [m] = 1000/60 \qquad (10)$$

Specifically, the second gear ratio-related information acquisition unit 44 acquires the circumferential length Ct [m] of the rear wheel 78 from the memory 42, acquires the rotation speed Ni [rpm] of the motor M from the rotation speed sensor SE1, acquires the actual vehicle speed No'2 [km/h] as the speed information from the GPS or the measuring device 12, and calculates the current composite gear ratio Rc2 from the equation (10).

The abnormality determination unit 45 may compare the reference composite gear ratio Rc1 stored in the memory 42 with the current composite gear ratio Rc2 calculated by the second gear ratio-related information acquisition unit 44, and determine the abnormality of the power transmission mechanism T in a case where the current composite gear ratio Rc2 is larger than the reference composite gear ratio Rc1. The abnormality determination unit 45 is the same as that of the first example in that the torque value Tq detected by the torque sensor SE2 is input and the abnormality determination is not performed in a case where the torque value is zero. The functions of the notification unit 46 and the motor control unit 41 are the same as those of the first example. In a case where the current composite gear ratio Rc2 obtained from the equation (10) is used, the vehicle speed No' [km/h] for calculating the current composite gear ratio Rc2 includes the component of the circumferential length Ct of the rear wheel 78, and thus, it is possible to determine both the abnormality caused by the increased diameter of the rear wheel 78 and the abnormality caused by the reduced diameter of the rear wheel 78.

According to the present modification example, it is possible to determine the abnormality of the power transmission mechanism T regardless of the rotation speed Ni [rpm] of the motor M after assembling the electric assist unit 20.

Third Example

FIG. 5 is a functional block diagram of a third example. In the third example, the above-described advancing distance L [m] is used as the first gear ratio-related information and the second gear ratio-related information.

In the third example, the advancing distance L [m] (hereinafter, the advancing distance L at the time of assembly is referred to as a reference advancing distance L1) is stored in the memory 42 by the manufacturer or the like when assembling the electric assist unit 20. The reference advancing distance L1 [m] is calculated from the reference composite gear ratio Rc1 and the circumferential length Ct [m] of the rear wheel 78 based on the equation (6). Since the reference composite gear ratio Rc1 is described in the first example, the description thereof will be omitted here.

The first gear ratio-related information acquisition unit 43 acquires the reference advancing distance L1 [m] from the memory 42. The second gear ratio-related information acquisition unit 44 acquires the advancing distance L [m] (hereinafter, the advancing distance L after assembling the electric assist unit 20 is referred to as an actual advancing distance L2) as moving distance information after assembling the electric assist unit 20, The actual advancing distance L2 [m] can be acquired from the receiver 11 in a case where the electric bicycle 10 is provided with the receiver 11 that acquires the moving distance information transmitted from the global positioning system (GPS), The actual advancing distance L2 [m] can also be acquired from the moving distance information transmitted from the GPS using the mobile terminal owned by the driver. The actual advancing distance L2 [m] may be acquired from the moving distance information obtained from the measuring device 12 in a case where the measuring device 12 such as a cycle computer is installed in the electric bicycle 10, instead of the moving distance information obtained from the GPS. In other words, the actual advancing distance L2 [m] is the advancing distance L acquired without using the reference advancing distance L1.

The abnormality determination unit 45 compares the reference advancing distance L1 [m] acquired by the first gear ratio-related information acquisition unit 43 with the actual advancing distance L2 [m] acquired by the second gear ratio-related information acquisition unit 44, and determines the abnormality of the power transmission mechanism T a case where the actual advancing distance L2 [m] is larger than the reference advancing distance L1 [m]. The abnormality determination unit 45 is the same as that of the first example in that the torque value Tq detected by the torque sensor SE2 is input and the abnormality determination is not performed in a case where the torque value is zero. The functions of the notification unit 46 and the motor control unit 41 are the same as those of the first example. In a case where the advancing distance L [m] is used as the first gear ratio-related information and the second gear ratio-related information, the advancing distance L [m] includes the component of the circumferential length Ct of the rear wheel 78, and thus, it is possible to determine both the abnormality caused by the increased diameter of the rear wheel 78 and the abnormality caused by the reduced diameter of the rear wheel 78.

Hereinafter, the reference value setting process and the abnormality determining process of the power transmission mechanism performed by the control device 40 will be described with reference to FIGS. 6 and 7. The reference value setting process and the abnormality determining process of the power transmission mechanism will be described using the first example (FIG. 3), but the processes can also be similarly performed for the second example (FIG. 4A), the modification example of the second example (FIG. 4B), and the third example (FIG. 5).

<Reference Value Setting Process>

The reference value setting process is a process of acquiring the reference composite gear ratio Rc1 which is the composite gear ratio Rc at the time of assembling the electric assist unit 20 for the abnormality determining process of the power transmission mechanism to be performed later.

Figure 6:
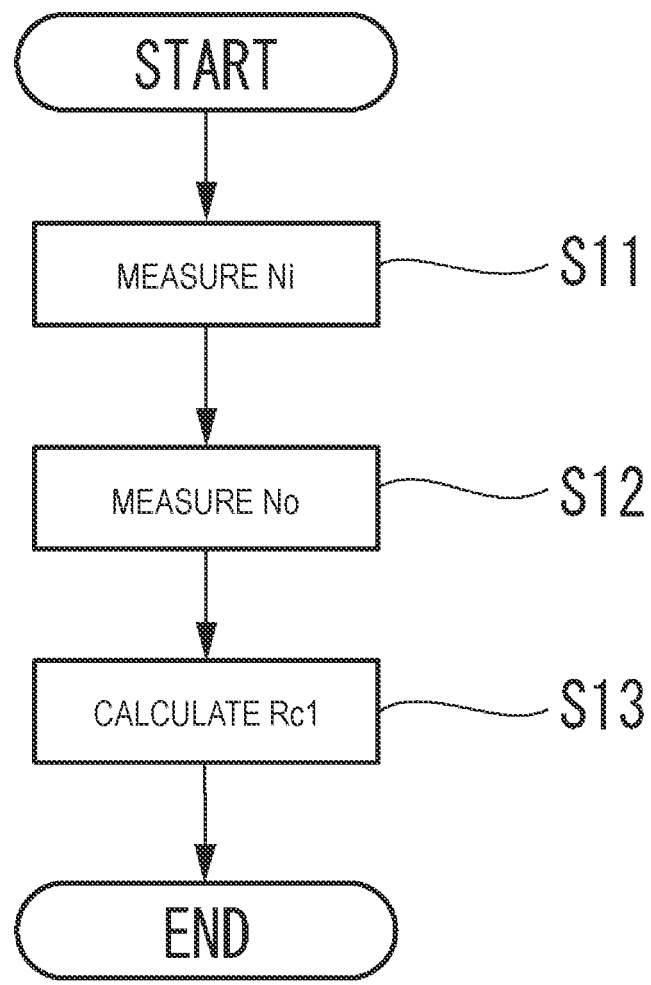
FIG. 6 is a control flow diagram of a reference value setting process.

As illustrated in FIG. 6, first, the manufacturer or the like rows the electric bicycle 10 and measures the rotation speed Ni [rpm] of the motor M (S11), and also measures the rotation speed No [rpm] of the rear wheel 78 (S12). Such measurements may be performed by rowing on a roller stand (cycle trainer) without moving the electric bicycle 10, or may be performed by actually traveling by the electric bicycle 10.

Subsequently, using the rotation speed Ni [rpm] of the motor M obtained in step S11 and the rotation speed No [rpm] of the rear wheel 78 obtained in step S12, the reference composite gear ratio ROI is calculated from the above-described equation (4) (S13).

The reference composite gear ratio Rc1 obtained in step S13 is stored in the memory 42 of the control device 40 by the manufacturer or the like. The reference composite gear ratio Rc1 is not necessarily stored in the memory 42 of the control device 40, and may be stored in a server accessible by the manufacturer or the like. By storing the reference composite gear ratio Rc1 in the memory 42 of the control device 40, the reference composite gear ratio Rc1 can be acquired regardless of the communication environment.

<Abnormality Determining Process of Power Transmission Mechanism>

The abnormality determining process of the power transmission mechanism is a process of determining an abnormality of the power transmission mechanism T after assembling the electric assist unit 20, and is a process of detecting that a state where the power transmission mechanism T does not comply with the regulations after assembling the electric assist unit 20.

Figure 7:
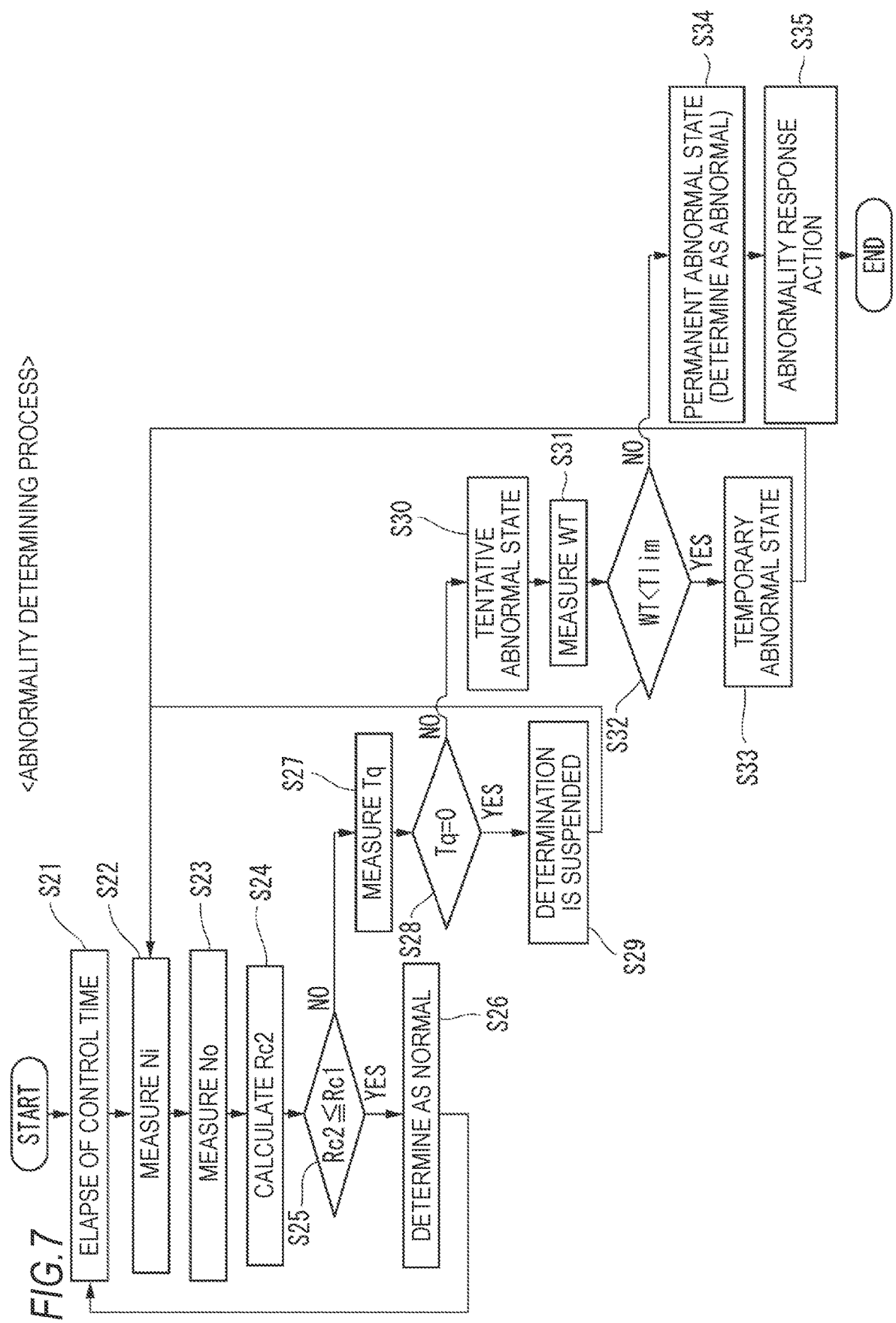
FIG. 7 is a control flow diagram of an abnormality determining process of a power transmission mechanism.

As illustrated in FIG. 7, the control device 40 waits for the elapse of a predetermined control time while the electric bicycle 10 is traveling (S21), measures the rotation speed Ni [rpm] of the motor M (S22), and measures the rotation speed No [rpm] of the rear wheel 78 (S23). Subsequently, using the rotation speed Ni [rpm] of the motor M measured in step S22 and the rotation speed No [rpm] of the rear wheel 78 measured in step S23, the current composite gear ratio Rc2 is calculated from the above-described equation (4) (S24).

Subsequently, the reference composite gear ratio Rc1 stored in the memory 42 is compared with the current composite gear ratio Rc2 (S24), and when the current composite gear ratio Rc2 is equal to or less than the reference composite gear ratio Rc1 (YES in S25), a state where the power transmission mechanism T does not comply with the regulations is determined (normality determination) (S26), Meanwhile, when the current composite gear ratio Rc2 is not equal to or less than the reference composite gear ratio Rc1, that is, when the current composite gear ratio Rc2 is larger than the reference composite gear ratio Rc1 (NO in S25), then the torque value Tq acting on the sleeve 26 is measured (S27), and it is determined whether the torque value Tq is zero (S28).

As a result, in a case where the torque value Tq is zero (YES in S28), the abnormality determination is suspended (529), and the control flow returns to step S22. In a case where the torque value Tq is not zero (NO in S28), that is, in a case where the torque due to the pedal stepping force or the driving force of the motor M is input to the sleeve 26, a state where the power transmission mechanism T tentatively does not comply with the regulations (tentative abnormal state) is determined (S30).

In a case where a state where the power transmission mechanism T tentatively does not comply with the regulations (tentative abnormal state) is determined, the elapsed time (hereinafter, referred to as an abnormality duration time WT) after the tentative abnormal state is detected is measured (S31), and it is detected whether the abnormality duration time WIT is within a predetermined time Tlim (S32). As a result, when the abnormality duration time WI is within the predetermined time Tlim (YES in S32), a state where the power transmission mechanism T temporarily does not comply with the regulations (temporary abnormal state) is determined (S33), and the control process returns to step S22. Meanwhile, in step S32, when the abnormality duration time WT exceeds the predetermined time Tlim (NO in S32), the abnormality is determined as a state where the power transmission mechanism T permanently does not comply with the regulations (permanent abnormal state) (S34), and an abnormality response action is taken (S35).

The abnormality response action includes the above-described caution display to the driver by the notification unit 46, notification to the manufacturer or the owner, and prevention or prohibition of the driving of the motor M by the motor control unit 41.

As an abnormality response action, the control device 40 may update the assist control program based on the current composite gear ratio Rc2 obtained in step S24. Accordingly, after the update, the motor M is controlled by the program newly set based on the power transmission mechanism T after the modification or repair, and thus, a state where the electric bicycle 10 does not comply with the regulations can return to a state where the electric bicycle 10 complies with the regulations.

In step S24, in a case where the current composite gear ratio Rc2 is equal to or less than the reference composite gear ratio Rc1 (YES in S25), a state where the power transmission mechanism T complies with the regulations is made, but when the current composite gear ratio Rc2 and the reference composite gear ratio Rc1 deviate from each other by a predetermined value or more, another abnormal state where the gear ratio changes may be determined.

In step S28, it is determined whether the torque value Tq acting on the sleeve 26 is zero, but it may be determined whether the torque value generated by the motor M is zero. In other words, in a case where the crankshaft 83 provided with the crank pedal 79 is set to the most upstream side in the torque flow direction, the torque sensor SE2 may acquire the torque on the downstream side of the first one-way clutch 28.

The present invention is not limited to the above-described embodiments, but may be appropriately modified, improved, and the like.

Figure 9:
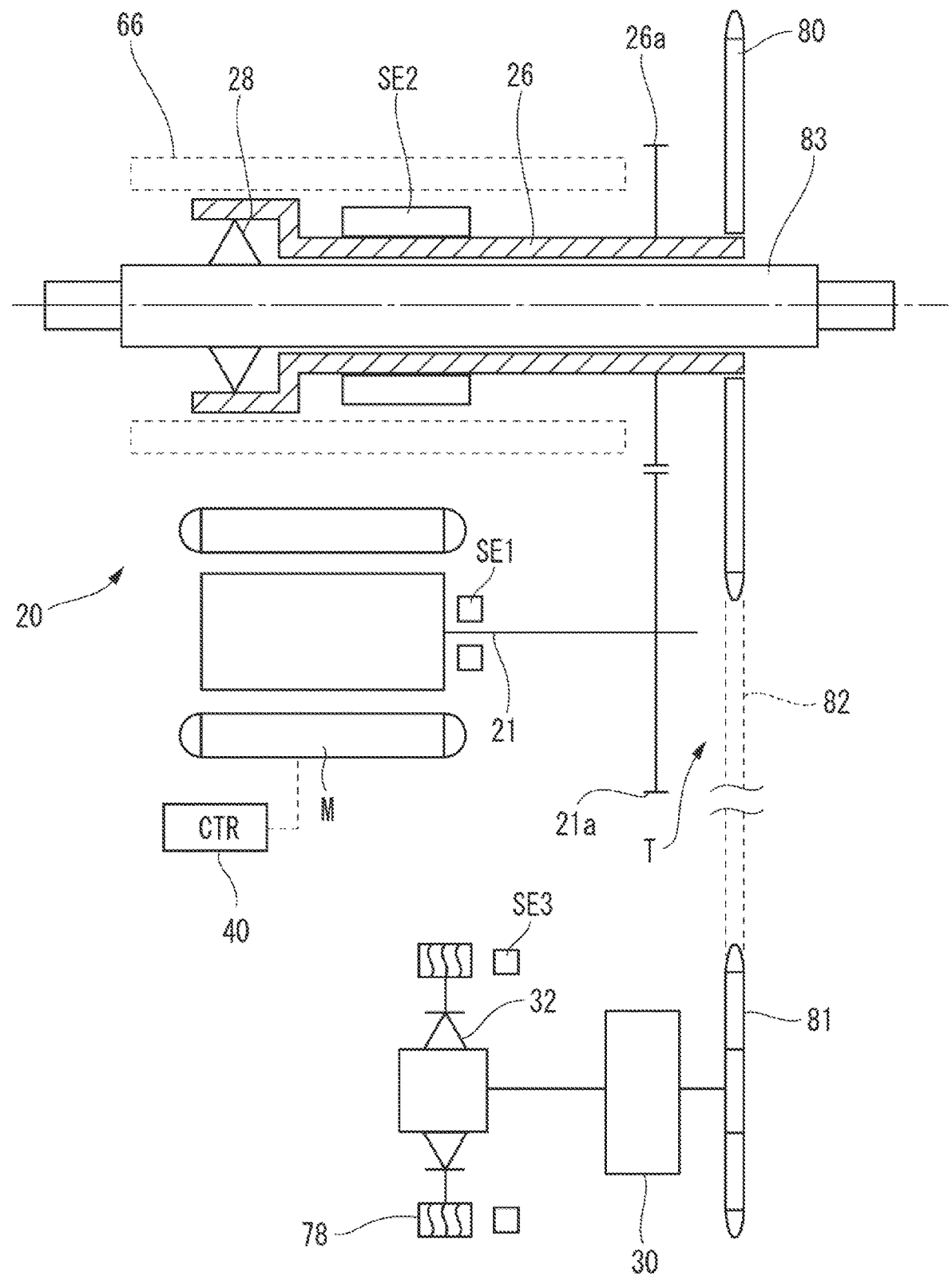
FIG. 9 is a schematic view of a power transmission mechanism according to a first modification example.

FIG. 9 is a schematic view of the power transmission mechanism according to a first modification example.

The power transmission mechanism T of the first modification example includes the switching transmission device 30 capable of switching the gear ratio between the driven sprocket 81 and the second one-way clutch 32.

Therefore, the gear ratio of the power transmission mechanism T of the first modification example is a value obtained by multiplying the gear ratio determined by the number of teeth (cogs) of the driving sprocket 80 and the driven sprocket 81 with the gear ratio of the switching transmission device 30. As such, even in the power transmission mechanism T including the switching transmission device 30, the abnormality determination of the power transmission mechanism T can be performed by the above-described reference value setting process and the abnormality determining process of the power transmission mechanism.

In a case where the power transmission mechanism T includes the switching transmission device 30, the information stored in the memory 42 in the reference value setting process is the reference composite gear ratio Rc1 in a case where the switching transmission device 30 has a gear step having the largest gear ratio. For example, in the three-step switching transmission device 30, in a case where the gear ratio gradually increases to first, second, and third steps, when the motor M is controlled according to a predetermined program, in the first and second gear steps, as illustrated by the one-dot chain line of T1 and the two-dot chain line of T2 in FIG. 10, a state of complying with the regulations is maintained. However, in the third step of gear ratio, as illustrated by the dotted line of T3 in FIG. 10, a situation that does not comply with the regulations can occur. In a case where the power transmission mechanism T includes the switching transmission device 30 capable of switching the gear ratio, by setting the reference composite gear ratio Rc1 based on the gear ratio in a case where the switching transmission device 30 has the gear step having the largest gear ratio, a state where the electric bicycle 10 does not comply with the regulations can be determined more accurately.

Figure 11:
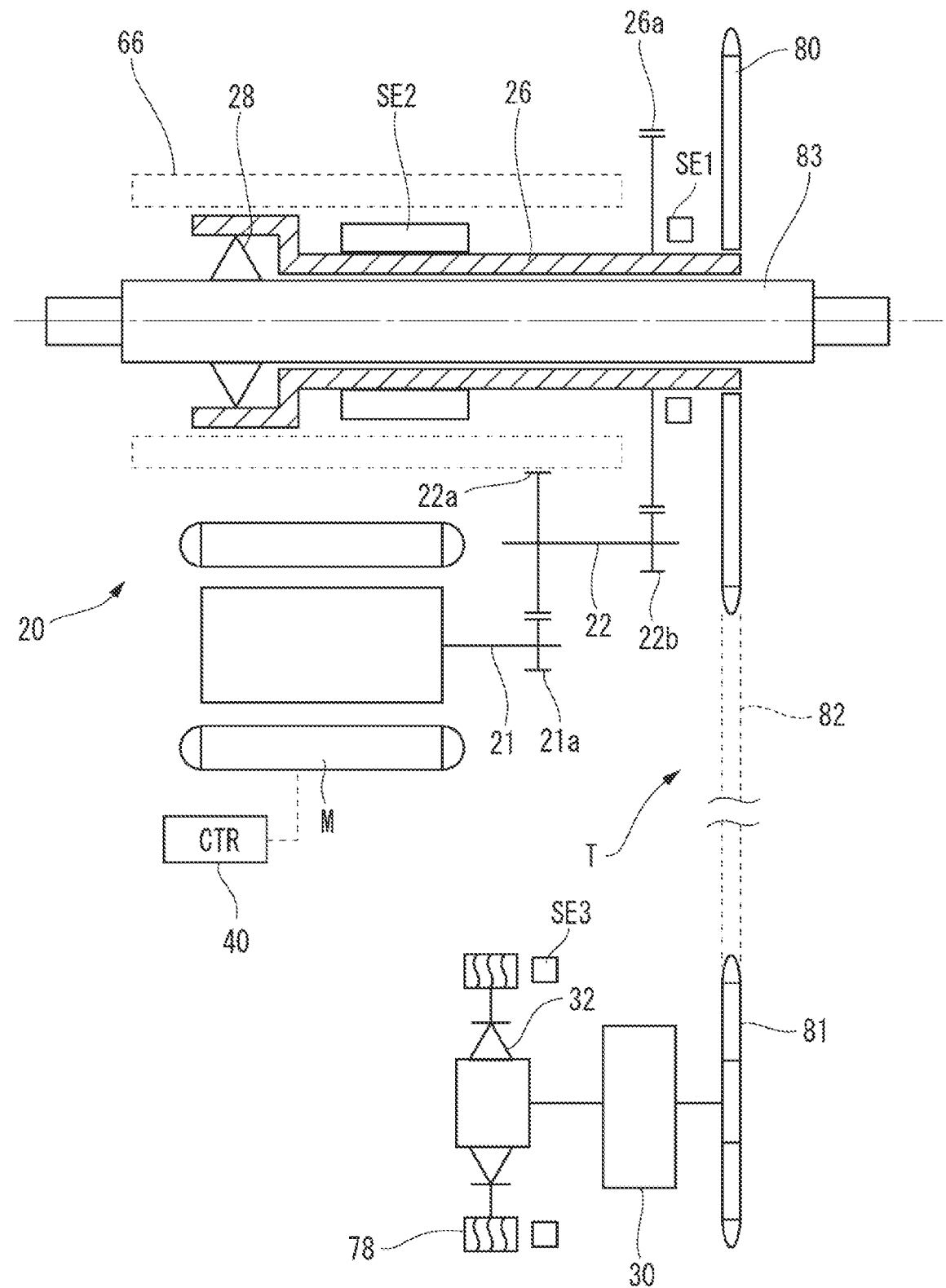
FIG. 11 is a schematic view of a power transmission mechanism according to a second modification example.

FIG. 11 is a schematic view of the power transmission mechanism T according to a second modification example.

In the above-described embodiment, the gear ratio between the motor output gear 21a and the driven gear 26a is set to 1, and the rotation speed of the sleeve 26 and the rotation speed of the motor M are configured to match each other. However, in the second modification example, the rotation speed of the sleeve 26 and the rotation speed of the motor M do not match each other, and a predetermined transmission is performed between the motor output gear 21a and the driven gear 26a.

When specifically describing, the electric assist unit 20 includes the output shaft 21 of the motor M, an idle shaft 22, and the crankshaft 83, which are arranged in parallel inside the case 24. The crankshaft 83 is rotatable supported inside the tubular sleeve 26 via the first one-way clutch 28, and the driven gear 26a and the driving sprocket 80 are fixed to the outer circumferential side of the sleeve 26. The idle shaft 22 includes an intermediate driven gear 22a that meshes with the motor output gear 21a provided on the output shaft 21 of the motor M, and an intermediate driving gear 22b that meshes with the driven gear 26a provided on the crank shaft 83, and the torque of the motor M is transmitted to the driving sprocket 80 via the motor output gear 21a, the intermediate driven gear 22a, the idle shall 22, the intermediate drive gear 22b, the driven gear 26a, and the sleeve 26.

The composite gear ratio Rc of the power transmission mechanism T of the second modification example is a value obtained by multiplying the gear ratio between the driving sprocket 80 and the driven sprocket 81, the gear ratio from the motor output gear 21a to the driven gear 26a, and the gear ratio of the switching transmission device 30.

In such an abnormality determination of the power transmission mechanism T, the rotation speed sensor is disposed on the sleeve 26, and based on gear ratio information related to a value obtained by multiplying the gear ratio from the sleeve 26 to the rear wheel 78, that is, the gear ratio between the driving sprocket 80 and the driven sprocket 81, and the gear ratio of the switching transmission device 30, the above-described reference value setting process and the abnormality determining process of the power transmission mechanism may be performed.

In the abnormality determination of the power transmission mechanism T, based on not only the gear ratio information related to the gear ratio of the entirety of the power transmission mechanism T but also the gear ratio of a part of the power transmission mechanism T from the sleeve 26 to the rear wheel 78, the above-described reference value setting process and the abnormality determining process of the power transmission mechanism may be performed.

Figure 12:
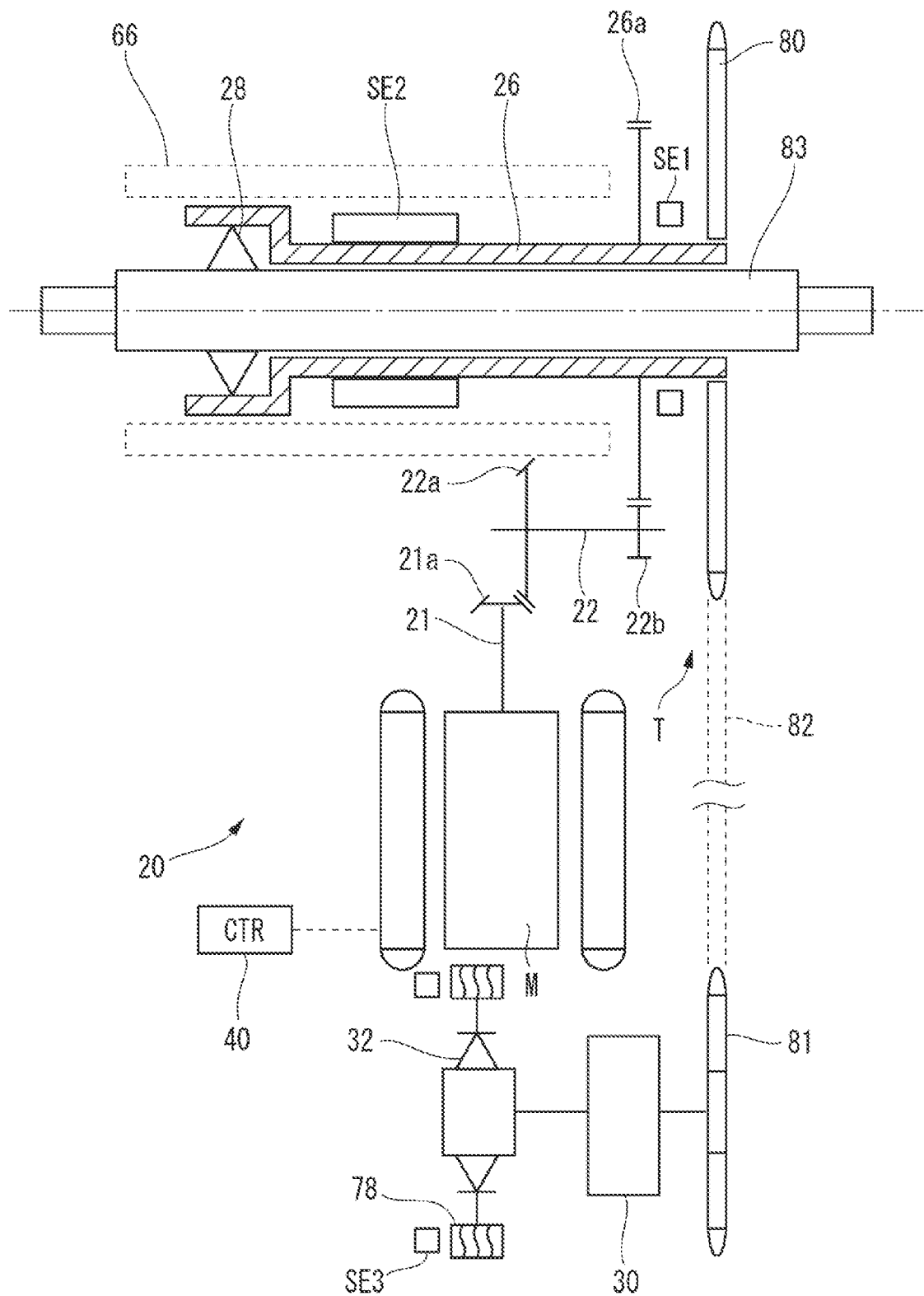
FIG. 12 is a schematic view of a power transmission mechanism according to a third modification example.

In the electric assist unit 20 of the above-described embodiment and the first and second modification examples, the output shaft 21 of the motor M and the crankshaft 83 were arranged in parallel, but similar to the third modification example illustrated in FIG. 12, the output shaft 21 of the motor M may be disposed perpendicular to the crankshaft 83. The power of the motor M is transmitted to the idle shaft 22 by, for example, a bevel gear mechanism or the like.

Figure 13:
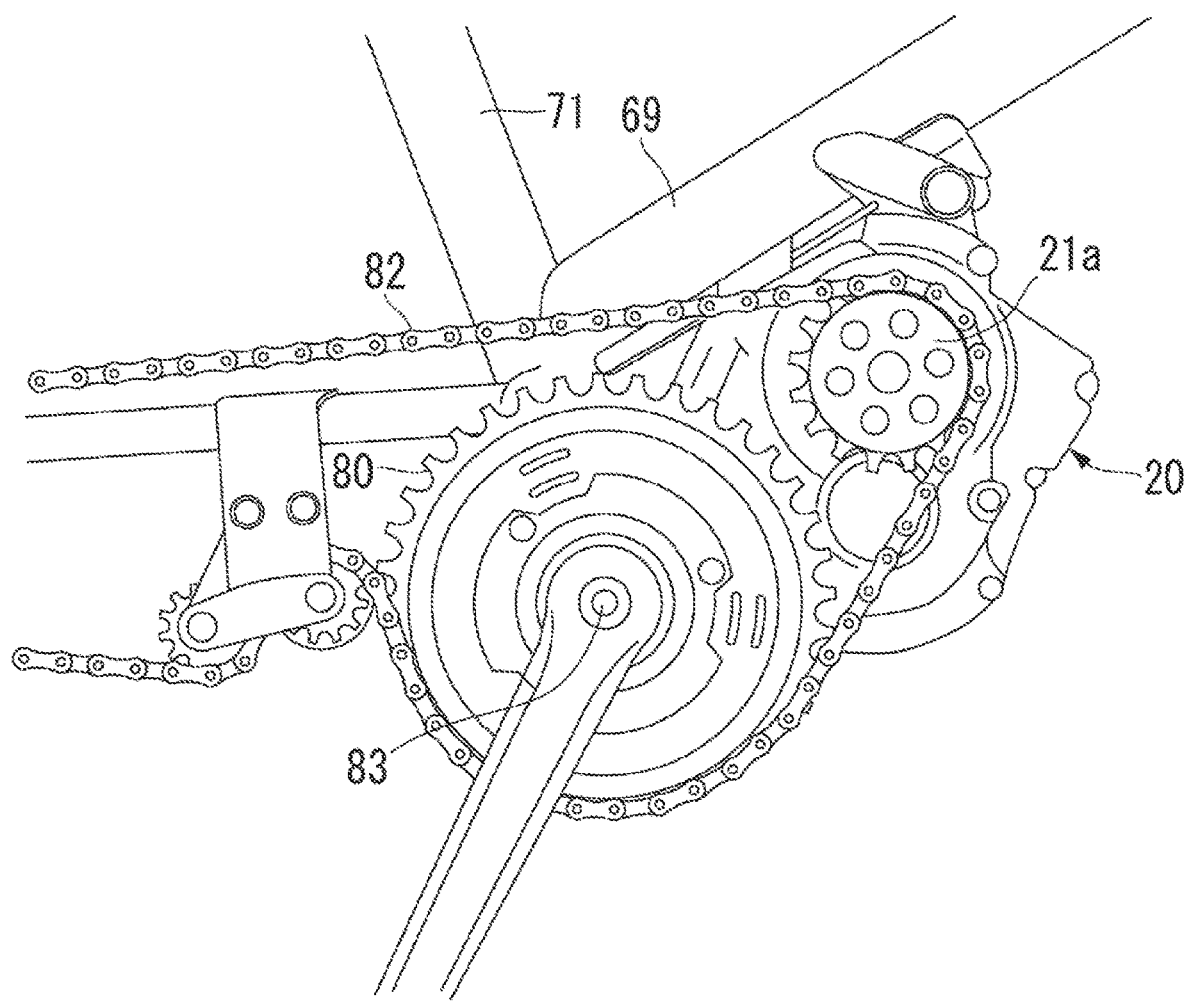
FIG. 13 is a schematic view of a power transmission mechanism according to a fourth modification example.

FIG. 13 is a schematic view of the power transmission mechanism T according to a fourth modification example.

In the power transmission mechanism T of the fourth modification example, as illustrated in FIG. 13, the chain 82 is wound around the driving sprocket 80, the motor output gear 21a of the motor M, and the driven sprocket 81 provided on the axle of the rear wheel 78, and is configured to directly transmit the power of the motor M to the chain 82. Even in the power transmission mechanism T, the abnormality determination of the power transmission mechanism T can be performed by the above-described reference value setting process and the abnormality determining process of the power transmission mechanism.

Although various embodiments were described with reference to the drawings, it is needless to say that the present invention is not limited to such examples. It is obvious that those skilled in the art can come up with various examples of changes or modifications within the scope of the claims, which are also naturally understood that the examples of changes or modifications belong to the technical scope of the present invention. Each configuration element in the above-described embodiment may be combined in any manner within the range that does not depart from the gist of the invention.

For example, the electric bicycle 10 was illustrated as a vehicle, but the present invention is not limited thereto, and a two-Wheeled vehicle without an input from the crank pedal 79, a tricycle other than the two-wheeled vehicle, or a four-wheeled vehicle may be used.

In the present specification, at least the following contents are described. In parentheses, the corresponding configuration elements and the like in the above-described embodiments are illustrated, but are not limited thereto.

(1) A vehicle including: an input unit (sleeve 26) to which power for driving the vehicle (electric bicycle 10) is input; an output unit (rear wheel 78) that outputs the power input to the input unit; and a power transmission mechanism (power transmission mechanism T) that transmits the power input to the input unit to the output unit, in which an abnormality of the power transmission mechanism is determined or driving performed by using the power transmission mechanism is prevented or prohibited based on first gear ratio-related information (reference composite gear ratio Rc1, reference vehicle speed No'1, reference advancing distance L1), which is information acquired at a first time and related to a gear ratio (composite gear ratio Rc) of a transmission section which is the entirely or a part of the power transmission mechanism, and second gear ratio-related information (current composite gear ratio Rc2, actual vehicle speed No'2, actual advancing distance L2), which is information acquired at a second time subsequent to the first time and related to a gear ratio (composite gear ratio Rc) of the transmission section.

According to (1), in a case where the gear ratio-related information changes due to non-complying modification or repair, based on the first gear ratio-related information and the second gear ratio-related information which are the gear ratio-related information before and after the non-complying modification or repair, by determining the abnormality of the power transmission mechanism or by preventing or prohibiting the driving performed by using the power transmission mechanism, it is possible to avoid a state where the vehicle does not comply with the regulations.

(2) The vehicle according (1), further including: a storage unit (memory 42) that stores the first gear ratio-related information.

According to (2), since the vehicle includes the storage unit that stores the first gear ratio-related information, the first gear ratio-related information can be acquired regardless of the communication environment.

(3) The vehicle according to (1) or (2), further including: a second gear ratio-related information acquisition unit (second gear ratio-related information acquisition unit 44) that acquires the second gear ratio-related information.

According to (3), since the vehicle further includes the gear ratio-related information acquisition unit that acquires the second gear ratio-related information, it is possible to acquire the second gear ratio-related information while the vehicle is traveling.

(4) The vehicle according to (3), in which the second gear ratio-related information acquisition unit acquires traveling information (actual vehicle speed No'2, actual advancing distance L2) from a global positioning system.

According to (4), the traveling information can be acquired by using the global positioning system.

(5) The vehicle according to (4), further including: a receiver (receiver 11) that acquires the traveling information transmitted from the global positioning system.

According to (5), the traveling information transmitted from the global positioning system can be acquired even when the driver does not have the receiver.

(6) The vehicle according to (3), further including: a measuring device (measuring device 12) that measures the traveling information of the vehicle, in which the second gear ratio-related information acquisition unit acquires the traveling information (actual vehicle speed No'2, actual advancing distance L2) from the measuring device.

According to (6), the traveling information can be acquired from the vehicle speed measuring device without using the global positioning system.

(7) The vehicle according to any one of (1) to (6), in which the first gear ratio-related information and the second gear ratio-related information are a gear ratio (composite gear ratio Rc) of the power transmission mechanism, a speed (vehicle speed No') of the vehicle, or an advancing distance (advancing distance L) traveled by the vehicle while the input unit makes one rotation.

According to (7), by comparing the gear ratio of the power transmission mechanism, the speed of the vehicle, or the advancing distance traveled by the vehicle while the input unit makes one rotation before and after the non-complying modification or repair, it is possible to easily detect a state where the vehicle does not comply with the regulations. Since the speed of the vehicle and the advancing distance traveled by the vehicle while the input unit makes one rotation include the component of the circumferential length of the output unit, it is possible to determine both the abnormality in a case where the diameter of the output unit is increased and the abnormality in a case where the diameter of the output unit is reduced.

(8) The vehicle according to (7), in which the first gear ratio-related information and the second gear ratio-related information are speeds of the vehicle.

According to (8), by comparing the vehicle speeds before and after the non-complying modification or repair, it is possible to easily detect the state where the vehicle does not comply with the regulations. Since the vehicle speed includes the component of the circumferential length of the output unit, it is also possible to determine the abnormality in a case where the diameter of the output unit is increased.

(9) The vehicle according to any one of (1) to (8), further including: a power acquisition unit (torque sensor SE2) that acquires power input to the input unit, in which the vehicle determines an abnormality of the power transmission mechanism or prevents or prohibits driving performed by using the power transmission mechanism when the power acquired by the power acquisition unit is larger than zero.

According to (9), when the abnormality determination or the like of the power transmission mechanism is performed when the power does not act on the input unit, there is a case where it is not possible to accurately acquire the gear ratio. Therefore, by performing the abnormality determination or the like of the power transmission mechanism when the power acquired by the power acquisition unit is larger than zero, it is possible to improve the determination accuracy.

(10) The vehicle according to (9), further including: a crankshaft (crankshaft 83) to which a stepping force of an occupant is input; a motor (motor M) that assists the stepping force; an input shaft (sleeve 26) to which power of the motor is input; and a one-way clutch (first one-way clutch 28) interposed between the crankshaft and the input shaft, in which the power acquisition unit is provided to acquire power on a downstream side of the one-way clutch.

According to (10), in the electric assist vehicle in which the crankshaft is on the most upstream side in the torque flow direction, the power acquisition unit is provided on the downstream side of the one-way clutch, and thus, it is possible to perform the abnormality determination of the power transmission mechanism with high determination accuracy based on the input of the power of the motor.

(11) The vehicle according to any one of (1) to (10), in which the power transmission mechanism includes a switching transmission device (switching transmission device 30) that can switch the gear ratio, and the first gear ratio-related information is gear ratio-related information in a case where the switching transmission device has a gear step having a largest gear ratio.

According to (11), in a case where the power transmission mechanism includes the switching transmission device capable of switching the gear ratio, by setting the gear ratio-related information to be the first gear ratio-related information in a case where the switching transmission device has the gear step having the largest gear ratio, it is possible to more accurately determine a state where the vehicle does not comply with the regulations.

(12) The vehicle according to any one of (1) to (11), in which the vehicle determines an abnormality of the power transmission mechanism when the second gear ratio-related information indicates that the gear ratio of the power transmission mechanism increased with respect to the first gear ratio-related information.

According to (12), when the gear ratio of the power transmission mechanism decreased, a state where the vehicle does not comply with the regulations is made, and thus, by determining the abnormality when the gear ratio of the power transmission mechanism increased, it is possible to appropriately determine a state where the vehicle does not comply with the regulations.

(13) The vehicle according to any one of (1) to (12), in which the vehicle is configured to be capable of determining an abnormality of the power transmission mechanism, and the vehicle displays a caution when an abnormality of the power transmission mechanism is determined.

According to (13), the occupant can recognize that a state where the power transmission mechanism does not comply with the regulations is made.

(14) The vehicle according to any one of (1) to (13), in which the vehicle is configured to be capable of determining an abnormality of the power transmission mechanism, and the vehicle notifies at least one of a user, an owner, a manufacturer, a seller, and a repairer when an abnormality of the power transmission mechanism is determined.

According to (14), the user or the like can recognize that the modification or repair is performed causing a state where the power transmission mechanism does not comply with the regulations.

(15) A vehicle including: an input unit (sleeve 26) to which power for driving the vehicle (electric bicycle 10) is input; an output unit (rear wheel 78) that outputs the power input to the input unit; and a power transmission mechanism (power transmission mechanism T) that transmits the power input to the input unit to the output unit, in which an abnormality of the power transmission mechanism is determined or driving performed by using the power transmission mechanism is prevented or prohibited based on first speed information (reference vehicle speed No'1), which is a speed (vehicle speed No') of the vehicle acquired in advance and obtained based on a gear ratio (reference composite gear ratio Rc1) of a transmission section which is the entirety or a part of the power transmission mechanism and a rotation state amount (rotation speed Ni) of the input unit, and second speed information (actual vehicle speed No'2), which is a speed (speed No') of the vehicle acquired without using the gear ratio.

According to (15), in a case where the gear ratio-related information changes due to non-complying modification or repair, based on the first speed information and the second speed information which are speed information before and after the non-complying modification or repair, by determining the abnormality of the power transmission mechanism or by preventing or prohibiting the driving using the power transmission mechanism, it is possible to avoid a state where the vehicle does not comply with the regulations.

(16) A method for monitoring an abnormality of a power transmission mechanism (power transmission mechanism T) installed in a vehicle (electric bicycle 10), the method including: a step of acquiring first gear ratio-related information (reference composite gear ratio Rc1, reference vehicle speed No'1, reference advancing distance L1), which is information related to a gear ratio (composite gear ratio Rc) of a transmission section which is the entirety or a part of the power transmission mechanism, at a first time; a step of acquiring second gear ratio-related information (current composite gear ratio Rc2, actual vehicle speed No'2, actual advancing distance L2), which is information related to a gear ratio (composite gear ratio Rc) of the transmission section, at a second time subsequent to the first time; and a step of determining an abnormality of the power transmission mechanism or preventing or prohibiting driving performed by using the power transmission mechanism based on the first gear ratio-related information and the second gear ratio-related information.

According to (16), in a case where the gear ratio-related information changes due to non-complying modification or repair, based on the first gear ratio-related information and the second gear ratio-related information which are the gear ratio-related information before and after the non-complying modification or repair, by determining the abnormality of the power transmission mechanism or by preventing or prohibiting the driving performed by using the power transmission mechanism, it is possible to avoid a state where the vehicle does not comply with the regulations.

REFERENCE SIGNS LIST

10 Electric bicycle (vehicle)
11 Receiver
12 Measuring device
26 Sleeve (input unit)
28 First one-way clutch (one-way clutch)
30 Switching transmission device
42 Memory (storage unit)
44 Second gear ratio-related information acquisition unit
78 Rear wheel (output unit)
83 Crankshaft
M Motor
T Power transmission mechanism
SE2 Torque sensor (power acquisition unit)

The invention claimed is:

1. A vehicle comprising:
an input unit to which power for driving the vehicle is input;
an output unit that outputs the power input to the input unit; and
a power transmission mechanism that transmits the power input to the input unit to the output unit, wherein
an abnormality of the power transmission mechanism is determined or driving performed by using the power transmission mechanism is prevented or prohibited based on
first gear ratio-related information, which is information acquired at a first time and related to a gear ratio of a transmission section which is the entirety or a part of the power transmission mechanism, and
second gear ratio-related information, which is information acquired at a second time subsequent to the first time and related to a gear ratio of the transmission section, and
the abnormality of the power transmission mechanism is determined or driving performed by using the power transmission mechanism is prevented or prohibited in a case where the second gear ratio-related information indicates that the gear ratio of the power transmission mechanism changed with respect to the first gear ratio-related information.

2. The vehicle according to claim 1, further comprising:
a storage unit that stores the first gear ratio-related information.

3. The vehicle according to claim 1, further comprising:
a second gear ratio-related information acquisition unit that acquires the second gear ratio-related information.

4. The vehicle according to claim 3, wherein
the second gear ratio-related information acquisition unit acquires traveling information from a global positioning system.

5. The vehicle according to claim 4, further comprising:
a receiver that acquires the traveling information transmitted from the global positioning system.

6. The vehicle according to claim 3, further comprising:
a measuring device that measures traveling information of the vehicle, wherein
the second gear ratio-related information acquisition unit acquires the traveling information from the measuring device.

7. The vehicle according to claim 1, wherein
the first gear ratio-related information and the second gear ratio-related information are a gear ratio of the power transmission mechanism, a speed of the vehicle, or an advancing distance traveled by the vehicle while the input unit makes one rotation.

8. The vehicle according to claim 7, wherein
the first gear ratio-related information and the second gear ratio-related information are speeds of the vehicle.

9. The vehicle according to claim 1, further comprising:
a power acquisition unit that acquires power input to the input unit, wherein
the vehicle determines an abnormality of the power transmission mechanism or prevents or prohibits driving performed by using the power transmission mechanism when the power acquired by the power acquisition unit is larger than zero.

10. The vehicle according to claim 9, further comprising:
a crankshaft to which a stepping force of an occupant is input;
a motor that assists the stepping force;
an input shaft to which power of the motor is input; and
a one-way clutch interposed between the crankshaft and the input shaft, wherein
the power acquisition unit is provided to acquire power on a downstream side of the one-way clutch.

11. The vehicle according to claim 1, wherein
the power transmission mechanism includes a switching transmission device that can switch the gear ratio, and
the first gear ratio-related information is gear ratio-related information in a case where the switching transmission device has a gear step having a largest gear ratio.

12. The vehicle according to claim 1, wherein
the vehicle determines an abnormality of the power transmission mechanism when the second gear ratio-related information indicates that the gear ratio of the power transmission mechanism increased with respect to the first gear ratio-related information.

13. The vehicle according to claim 1, wherein
the vehicle is configured to be capable of determining an abnormality of the power transmission mechanism, and
the vehicle displays a caution when an abnormality of the power transmission mechanism is determined.

14. The vehicle according to claim 1, wherein
the vehicle is configured to be capable of determining an abnormality of the power transmission mechanism, and
the vehicle notifies at least one of a user, an owner, a manufacturer, a seller, and a repairer when an abnormality of the power transmission mechanism is determined.

15. A method for monitoring an abnormality of a power transmission mechanism installed in a vehicle, the method comprising:
a step of acquiring first gear ratio-related information, which is information related to a gear ratio of a transmission section which is the entirety or a part of the power transmission mechanism, at a first time;
a step of acquiring second gear ratio-related information, which is information related to a gear ratio of the transmission section, at a second time subsequent to the first time; and
a step of determining an abnormality of the power transmission mechanism or preventing or prohibiting driving performed by using the power transmission mechanism based on the first gear ratio-related information and the second gear ratio-related information in a case where the second gear ratio-related information indicates that the gear ratio of the power transmission mechanism changed with respect to the first gear ratio-related information.

* * * * *